United States Patent [19]

Masumoto et al.

[11] Patent Number: 4,865,948
[45] Date of Patent: Sep. 12, 1989

[54] OPTICAL RECORDING MATERIAL, PROCESS FOR PREPARING THE SAME AND OPTICAL RECORDING METHOD

[75] Inventors: Tsuyoshi Masumoto, Sendai; Kenji Suzuki, Izumi; Mika Okubo; Akira Matsumoto, both of Tokushima; Nobuhiro Ota, Naruto; Shuji Masuda, Tokushima, all of Japan

[73] Assignees: Research Development Corporation of Japan, Tokyo; Otsuka Kagaku Kabushiki Kaisha, Osaka; Nikon Corporation, Tokyo, all of Japan

[21] Appl. No.: 763,368

[22] Filed: Aug. 7, 1985

[30] Foreign Application Priority Data

Aug. 9, 1984 [JP] Japan .................................. 59-167113
Oct. 18, 1984 [JP] Japan .................................. 59-219186
Mar. 7, 1985 [JP] Japan .................................. 60-45181
Mar. 7, 1985 [JP] Japan .................................. 60-45182

[51] Int. Cl.$^4$ ............................................. G03C 1/72
[52] U.S. Cl. .................................... 430/270; 430/274; 430/346; 430/495; 430/945; 346/135.1
[58] Field of Search ............... 430/495, 945, 346, 348, 430/270, 374; 346/135.1

[56] References Cited

U.S. PATENT DOCUMENTS

| 3,971,874 | 7/1976 | Ohta et al. | 428/432 |
| 4,322,839 | 3/1982 | Yamashita et al. | 369/122 |
| 4,370,391 | 1/1983 | Mori et al. | 428/697 |
| 4,383,029 | 5/1983 | Yamada et al. | 430/541 |
| 4,461,807 | 7/1984 | Mori et al. | 428/469 |
| 4,599,298 | 7/1986 | Fisch | 430/271 |
| 4,659,588 | 4/1987 | Yamada et al. | 427/42 |
| 4,670,345 | 6/1987 | Morimito et al. | 428/411.1 |

FOREIGN PATENT DOCUMENTS 0133134 10/1979 Japan .................................. 430/495

Primary Examiner—Paul R. Michl
Assistant Examiner—Lee C. Wright
Attorney, Agent, or Firm—Armstrong, Nikaido, Marmelstein, Kubovcik & Murray

[57] ABSTRACT

This invention provides an optical recording material comprising a base and a thin film formed on the base and composed of oxides which are represented by the formula $(V_2O_5)_{1-x} \cdot (M_yO_z)_x$ wherein $M_yO_z$ is at least one of metal oxides, metalloid oxides and non-metal oxides, and $0 \leq x < 1$ and which have an amorphous or layer structure and a process for preparing an optical recording material, the process comprising the steps of applying to a base a solution, sol solution or gel solution of amorphous oxides represented by the formula $(V_2O_5)_{1-x} \cdot (M_yO_z)_x$ wherein $M_yO_z$ is at least one of metal oxides, metalloid oxides and nonmetal oxides, and $0 \leq x < 1$, and evaporating off the solvent.

8 Claims, 17 Drawing Sheets

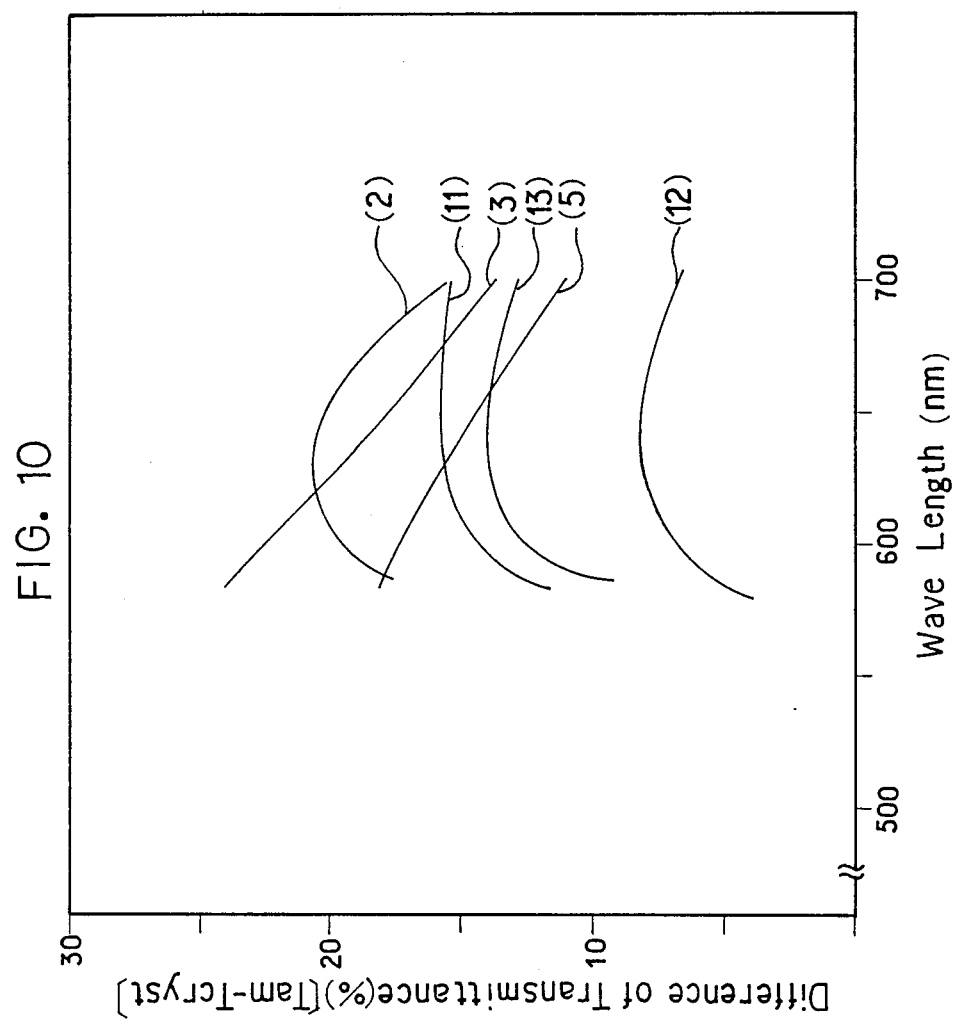

OPTICAL RECORDING MATERIAL, PROCESS FOR PREPARING THE SAME AND OPTICAL RECORDING METHOD

This invention relates to optical recording materials, processes for preparing the same and optical recording methods.

Attention has been directed to optical information-recording media because such media have packing density tens or hundreds of times as high as that of conventional magnetic recording media. Now research is under way to develop opticomagnetic recording methods, optical recording methods utilizing light and heat, etc.

Methods for preparing optical recording media currently under investigation include those in which a thin film is formed on a base by PVD processes such as sputtering, vacuum deposition, ion-beam deposition and the like; those in which a thin film is produced by CVD processes; those in which a photochromic material or like photosensitive material is dispersed in an organic polymer and the dispersion is applied to a base; etc.

Of these methods, those utilizing the PVD and CVD processes, which produce thin films in high vacuum, involve batchwise supply and discharge of materials and bases. Further these processes give thin films in significantly low yields and form thin films with poor adherence to a base. In addition, the methods require a precision temperature control of bases to obtain high quality films, and need adequate selection of base materials which seriously affect the functions of the film. Moreover, the methods involve complicated manufacturing procedures and precision equipment to prepare optical information-recording media having a multilayer structure.

Recently it has been proposed to prepare recording media by applying to a base a composition comprising a resin and an organic colorant capable of absorbing light rays with a specific wavelength in a maximum degree. The proposed recording media, however, generally have a low reflectivity, hence unfit for practical use.

While fundamental research has markedly advanced on recording, reproduction, erasing and the like in optical information-recording systems, problems currently remain in respect of recording media and processes for preparing the media because of the foregoing obstacles.

We conducted extensive research to overcome the drawbacks of conventional processes and found that when applying to a base a solution, sol solution or gel solution of amorphous oxides having $V_2O_5$ as the matrix and drying the layer thus formed, a smooth-surfaced, uniform thin film can be prepared with extreme ease, the film having such a high electroconductivity of about 1 to about $10^{-2}$ $(\Omega.cm)^{-1}$ as to effectively prevent electrification throughout the medium which is thus less susceptible to deposition of dust and soiling and the film being able to form sharp pits on its surface or to induce a phase transition from amorphous to crystal structure when exposed to laser radiation.

This invention provides an optical recording material comprising a base and a thin film formed on the base and composed of oxides which are represented by the formula $(V_2O_5)_{1-x}.(M_yO_z)_x$ wherein $M_yO_z$ is at least one of metal oxides, metalloid oxides and non-metal oxides, and $0 \leq x < 1$ and which have an amorphous or layer structure.

This invention also provides a process for preparing an optical recording material, the process comprising the steps of applying to a base a solution, sol solution or gel solution of amorphous oxides represented by the formula $(V_2O_5)_{1-x}.(M_yO_z)_x$ wherein $M_yO_z$ is at least one of metal oxides, metalloid oxides and nonmetal oxides, and $0 \leq x < 1$, and evaporating off the solvent.

We further found that a uniform, smooth-surfaced thin film can be also prepared with extreme ease by applying to a base the foregoing solution containing at least one of organic materials, organic metallic compounds, inorganic metallic compounds and inorganic metalloid compounds capable of producing optical effects and drying the film formed and that the film thus obtained has more improved properties required of optical recording media.

In other words, this invention also provides an optical recording material comprising a base and a thin film formed on the base and composed of oxides represented by the formula $(V_2O_5)_{1-x}.(M_yO_z)_x$ wherein $M_yO_z$ is at least one of metal oxides, metalloid oxides and nonmetal oxides, and $0 \leq x < 1$ and having an amorphous structure or layer structure in which at least one of organic materials, organic metallic compounds, inorganic metallic compounds and inorganic metalloid compounds is intercalated between the layers of the oxides.

This invention further provides a process for preparing an optical recording material, the process comprising the steps of applying to a base a solution, sol solution or gel solution containing (i) amorphous oxides represented by the formula $(V_2O_5)_{1-x}.(M_yO_z)_x$ wherein $M_yO_z$ is at least one of metal oxides, metalloid oxides and nonmetal oxides, and $0 \leq x < 1$ and (ii) at least one of organic materials, organic metallic compounds, inorganic metallic compounds and inorganic metalloid compounds and evaporating off the solvent.

This invention will be described below in more detail with reference to the accompanying drawings.

When the drying temperature of the solvent is lower than the glass transition point of the oxides of the formula $(V_2O_5)_{1-x}.(M_yO_z)_x$, the oxides deposited on the base according to this invention have the lattice planes of $V_2O_5$ arranged in the direction of c axis and comprise the layers randomly arranged in the directions of a and b axes and having an amorphous structure according to X-ray diffraction analysis. In this case, if an additive is used, the additive is intercalated between these layers. When the drying temperature of the solvent is higher than the glass transition point and lower than the crystallization temperature, the oxides have the lattice planes of $V_2O_5$ aligned in the directions of a and b axes and comprise the layers of $V_2O_5$ having a stabilized layer structure. In this case, if an additives is used, the additive is intercalated between these layers.

The amorphous oxides of this invention having $V_2O_5$ as the matrix are represented by the formula $(V_2O_5)_{1-x}.(M_yO_z)_x$ wherein M is at least one of metal oxides, metalloid oxides and nonmetal oxides, and $0 \leq x < 1$. Usable as $M_yO_z$ are a variety of oxides according to a particular application such as oxides of: Li, Na, K and Cs in Group Ia; Be, Mg, Ca, Sr and Ba in Group IIa., Y in Group IIIa; Ti and Zr in Group IVa; Nb and Ta in Group Va., Cr, Mo and W in Group VIa; Mn in Group VIIa., Fe, Co, Ni, Ru, Rh, Pd and Os in Group VIII., Cu, Ag and Au in Group Ib; Zn, Cd and Hg in Group IIb., B, Al, Ga, In and Tl in Group IIIb; Si, Ge, Sn and Pb in Group IVb; P, As, Sb and Bi in Group Vb; Se and Te in Group VIb; lanthanides, e.g., La, Ce, Nd, Gd, Tb and Er, etc. The conjoint use of $M_yO_z$ gives the following advantages: the oxide of Bi, Ti, Te, Ge, Cr, Fe, Ag, W or the like increases the optical sensitivity of recording materials; the oxide of Cr, Mo, W, Fe, Co, Ti, Nb, Ni, Cu, Ag, Tl, Pb, Bi, Nd, V or the like is effective in increasing the reflectivity of recording materials, achieving tracking and focusing with higher precision, and writing information at an enhanced absorptivity on exposure to lasers having a specific range of wavelength such as He-Ne lasers of 632 nm, semiconductor lasers of 750 to 850 nm and near-ultraviolet radiation lasers of 300 to 500 nm; and the oxide of V, Pb, Te, Bi, Sn, Cd, In, Zn or the like enables a phase change from amorphous to crystal structure to occur with use of even a low amount of energy. These oxides can be singly used or at least two of them are usable in admixture according to a particular application.

The amorphous oxides of the formula $(V_2O_5)_{1-x} \cdot (M_yO_z)_x$ to be used in this invention can be prepared in a conventional manner for example by heating a vanadium compound serving as the $V_2O_5$ source and a compound used as the $M_yO_z$ source to obtain a melt and spraying the melt over the surface of a roll rotated at a high speed to instantly quench the melt, giving amorphous oxides. This method is advantageous in involving lower production costs. Such methods are disclosed for example in Japanese Unexamined Patent Publications Nos. 152562/1980; 160193/1980; 142197/1980; 211444/1983; 220916/1983; 210434/1983; 212061/1983; 64273/1983; 67463/1983; 65083/1983; 65003/1983; 66685/1983; 67462/1983; 69640/1983; 69641/1983; 66684/1983; 65004/1983; 68962/1983; 169208/1982; 79736/1983; 79739/1983, etc. The oxides may be also produced by thermally melting the starting materials and atomizing the melt by injection with gas at high pressure to quench the same, or by vaporizing the materials by PVD or CVD methods or by piling up the oxides on a base by ionization or gas phase reaction.

A solution, or sol solution or gel solution of the amorphous oxides of the composition $(V_2O_5)_{1-x} \cdot (M_yO_z)_x$ which is used in this invention can be prepared for example by the following processes:

(i) a process in which the amorphous oxides of the composition position $(V_2O_5)_{1-x} \cdot (M_yO_z)_x$ prepared by the methods of foregoing publications are dissolved or dispersed in a solvent, (ii) a process in which the starting materials for $(V_2O_5)_{1-x} \cdot (M_yO_2)_x$ are thermally melt and the melt is added to a solvent to dissolve the melt and form an amorphous product solution substantially at the same time, (iii) a process comprising dissolving vanadium and alcoholate in a solvent, and (iv) a process comprising dissolving vanadate in a solvent.

The materials of the formula $(V_2O_5)_{1-x} \cdot (M_yO_z)_x$ assume the form of pillar-shaped colloidal particles in a solution. These particles have a structure in which a greater number of water molecules are retained between the layers of $V_2O_5$ with the lattice planes of $V_2O_5$ regularly arranged in the direction of c axis but the layers are randomly arranged in the directions of a and b axes.

The solution to be used in this invention is usually prepared using water as a solvent and has an oxide concentration of about 0.001 to about 5% by weight. If the oxide concentration is less than 0.001% by weight, uneven coating tends to be formed over a substrate. The presence of over 5% by weight of oxides is likely to result in coating irregular in thickness. When a base to be coated with the solution is poor in hydrophilic property, the affinity of the solution with the base can be improved by adding an organic solvent or an affinity promotor to the solution. Examples of such organic solvents and affinity promotors are alcohols such as methanol, ethanol, propanol, isopropanol, butanol, isobutanol, secondary amyl alcohol, furfuryl alcohol, tetrahydrofurfuryl alcohol, methoxymethoxy ethanol, 1-butoxyethoxy propanol, diethylene glycol, triethylene glycol, tetraethylene glycol, polyethylene glycol, propylene glycol, dipropylene glycol, polypropylene glycol, trimethylene glycol, hexylene glycol, butanediol, 1,5-pentanediol, trimethylolpropane, 1,2,6-hexanediol, glycerin, etc.; ketones such as dimethyl ketone, methyl acetone, methyl ethyl ketone, acetonylacetone, diacetone alcohol, cyclohexanone, etc.; esters such as methyl acetate, triethyl phosphate, ethylene glycol monoacetate, ethylene glycol diacetate, ethylene glycol monomethyl ether acetate, ethylene glycol diformate carbitol acetate, diethylene glycol acetate, glyceryl acetate, glyceryl diacetate, cellosolve acetate, ethylene chlorohydrin, propylene chlorohydrin, glycerin-α-monochlorohydrin, etc.; ethers such as methylcarbitol, ethylcarbitol, butylcarbitol, methylethylcarbitol, diethylcarbitol, ethylene glycol monomethyl ether, ethylene glycol isopropyl ether, diethylene glycol dimethyl ether, triethylene glycol monomethyl ether, triethylene glycol monoethyl ether, propylene glycol monomethyl ether, propylene glycol monoethyl ether, dipropylene glycol monomethyl ether, dipropylene glycol monoethyl ether, tripropylene glycol monomethyl ether, ethyl cellosolve, diethyl cellosolve, butyl cellosolve, phenyl cellosolve, methylal, etc.; amides such as dimethylformamide, formamide, acetamide, etc.; organic acids such as formic acid, acetic acid, propionic acid, butyric acid, butyric anhydride, isobutyric acid, isovaleric acid, trimethylacetic acid, monochloroacetic acid, dichloroacetic acid, lactic acid, phenol, cresol, etc.; amines such as monomethylamine, dimethylamine, trimethylamine, monoethylamine, diethylamine, triethylamine, n-butylamine, isobutylamine, secondary butylamine, secondary hexylamine, monoethanolamine, diethanolamine, triethanolamine, ethylmonoethanolamine, n-butylmonoethanolamine, diethylethanolamine, ethyldiethanolamine, n-butyldiethanolamine, triisopropanolamine, α-picoline, β-picoline, γ-picoline, pyridine, quinoline, morpholine, ethyl morpholine, etc.; and other substances such as dimethyl sulfoxide, tetrahydropyran, tetrahydrofuran, trioxane, 1,4-dioxane, 1,2-propylene oxide, etc. The amount of the organic solvent or affinity promotor used varies from about 0.01 to about 10 times the amount of the solution according to the concentration of the solution, the kind of base material, etc. A high polymer can be incorporated into the solution to obtain a suitable viscosity which leads to coating having a uniform thickness and an improved adherence to the base and to form information pits or bumps with increased precision. Useful high polyers include polyvinyl alcohol, polyvinyl acetate, polyacrylamide, polyacrylic acid, polyethylene glycol, nitrocellulose, cellulose acetate, cellulose acetate butyrate, cellulose propionate, ethyl cellulose, methyl cellulose, carboxymethyl cellulose and like organic polymers, and polyphosphoric acid, water glass and like inorganic polymers. When an organic solvent is conjointly used, use can be also made of high polymers such as polymethyl methacrylate, polyethylene polycarbonate, polyester, etc. The amount of the high polymer is about 0.01 to about 10% by weight based on the weight of the solution. The solution to be used in this invention may further contain as a pH-controlling agent sodium acetate, ammonium acetate, etc. and as an emulsifier, cationic surface active agent and nonionic surface active agent.

To the solution according to the present invention can be added at least one of organic materials, organic metallic compounds, inorganic metallic compounds and inorganic metalloid compounds. In this case, the solution is applied to the base and dried to deposit a thin film of $(V_2O_5)_{1-x} \cdot (M_yO_z)_x$ having an amorphous or layer structure in which such additive is intercalated between the layers. The thin film thus produced exhibits improved functions required of optical information-recording materials. Examples of these additives are as follows.

I. Organic materials

Dyes and light-absorbable colorants

Fluoresceine

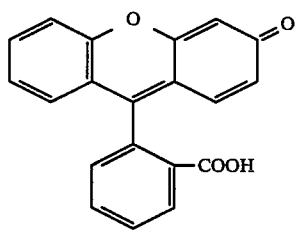

Polyester yellow

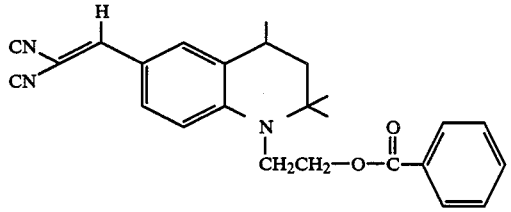

Squalium colorants such as

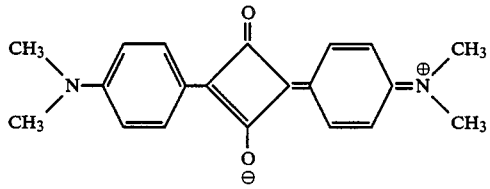

Cyanine colorants such as

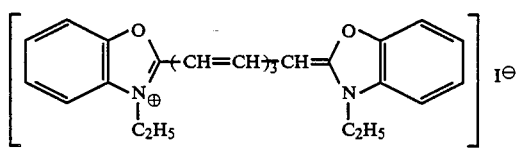

Pentamethinium colorants such as

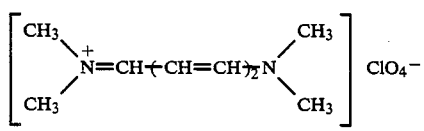

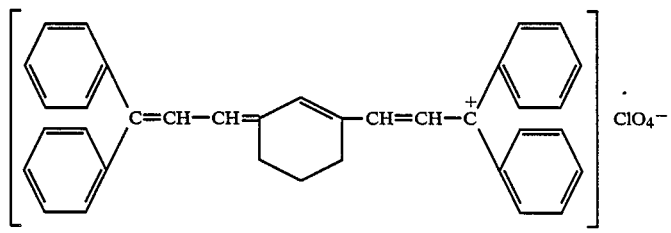

Naphthoquinone dyes such as

Dyes and light-absorbable colorants
-continued

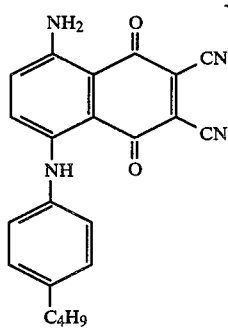

Triarylmethane dyes such as

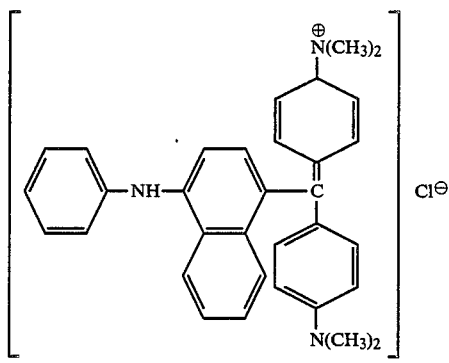

Spiropyran colorants such as

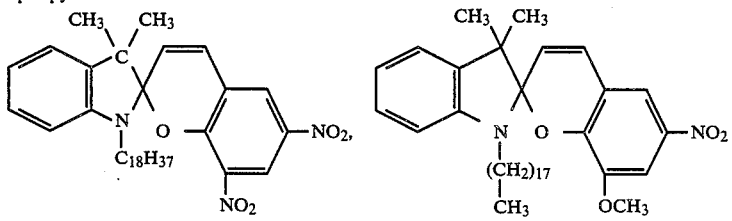

The use of at least one of these additives results in optical recording materials which enable the selective absorption of light rays of specific wavelength, thereby increasing the optical sensitivity and which are capable of recording or reproducing by utilizing the fluorescence reflection caused by the generation of fluorescence energy on radiation at a wavelength in the ultraviolet region. When using dyes or the like capable of causing optical transition, there is provided optical recording materials which are able to perform multiple recording with light rays of different wavelengths.

II. Organic metallic compounds

Benzene thiol-nickel complex

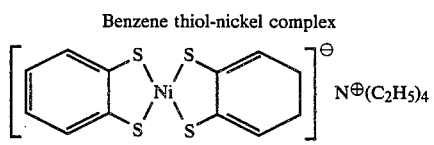

1,2,3,4-Tetrachloro-5,6-dithiol-nickel complex
Bis(diiminosuccinonitrilo)-nickel complex
Phthalocyanine colorants (such as lead phthalocyanine, titanium phthalocyanine, cobalt phthalocyanine and nickel phthalocyanine)
Tetradehydrocholine colorants such as -continued

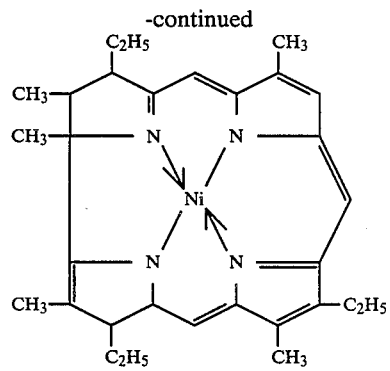

III. Metallic or metalloid compounds

Metallic and metalloid oxides, hydroxides, and salts of Cr, Mo, W, Fe, Co, Mn, Ti, Nb, Ni, Cu, Ag, Tl, Pb, Bi, Nd, V, Hg, Sn, In, Cd, Zn, Tb, Gd, Te, Ge Si, B and the like.

(i) Improved reflectivity is exhibited by a thin film in which at least one of oxides, hydroxides and salts of Bi, Ti, Te, Ge, Si, B, Ag and W is intercalated between the layers.

(ii) Enhanced absorptivity is achieved by a thin film in which at least one of oxides, hydroxides and salts of Cr, Mo, W, Fe, Co, Nb, Ni, Cu, Ag, Tl, Pb, Nd, V, Hg, Sn and In is intercalated between the layers.

(iii) Even with a small amount of energy, a phase transition from amorphous to crystal structure can be performed by a thin film in which at least one of oxides, hydroxides and salts of U, Pb, Te, Bi, Sn, Cd, In and Zn is intercalated between the layers.

(iv) Usable as opticomagnetic recording materials are those having a thin film in which at least one of Fe, Co, Mn, Ni, Nd, Tb, Gd and like magnetic compounds is intercalated between the layers.

These additives are added to the solution in an amount of about 0.001 to about 1 mole per mole of $V_2O_5$ in the thin film. The presence of more than 1 mole of the additive results in thin film having less smooth surface, hence undesirable.

According to this invention, the solution containing $(V_2O_5)_{1-x}\cdot(M_yO_z)_x$ and when required, an additive to be intercalated is applied to a base. The coating method is not particularly limited and include methods using a spray, coater, brush or spinner or involving immersion or the like. Substrates to be coated in this invention can be any of those used commonly for optical information-recording media. For example, bases made of glass, synthetic resin or metal are usable in this invention. When required, the process of this invention can employ bases having a surface primed with a material high in percent light absorption (hereinafter referred to as absorptivity) and in reflectivity.

The solution applied to the base is dried at a temperature which ranges from room temperature to about 500° C. and which is lower than the crystallization temperature of $(V_2O_5)_x\cdot(M_yO_z)_{1-x}$. When dried, the solvent evaporates off to stabilize the molecular structure, giving a smooth-surfaced, uniform, pale yellow film. Preferred thickness of thin film is about 0.05 to about 0.2 μm to make efficient use of optical recording materials. The films thus formed are high in adherence to a substrate, uniformly smooth-surfaced, and capable of producing sharp recording pits or bumps when exposed to radiation of various laser beams and inducing a phase change from amorphous to crystal structure by altering the output of laser. Although the range of heat-treating temperature employable in this invention can be suitably determined depending on the composition of $(V_2O_5)_{1-x}\cdot(M_yO_z)_x$ and on the kind of additives to be intercalated, the solution must be dried at a temperature lower than the crystallization temperature of $(V_2O_5)_{1-x}\cdot(M_yO_z)_x$ deposited on the substrate because a thin film requires an amorphous or layer structure in order to exhibit the foregoing characteristics.

According to this invention, a thin layer having a high absorptivity and a high reflectivity may be deposited on or under the layer of recording medium so that the optical recording media obtained by applying and drying the solution in the foregoing manner can achieve a higher recording efficiency. Examples of such thin layers are resin layers produced by applying a dye of high absorptivity dispersed in a solution of polyvinyl alcohol or nitrocellulose or by applying aluminum particles of high reflectivity dispersed in a solution of polyvinyl alcohol to the surface of a substrate.

According to this invention, the durability of the optical recording material can be further improved by producing an organic or inorganic protective layer of low refractive index and high light transmittance over the recording medium. Examples of materials useful for this purpose include polyester resins, urethane resins, acrylic resins, inorganic glass, etc.

FIG. 1 is a cross sectional view showing an example of optical recording materials according to this invention. In FIG. 1, indicated at 1 is a substrate; 2, a layer of high reflectivity or layer of high absorptivity; 3, an amorphous layer; and 4, a transparent protective layer. An optical information-recording tape can be obtained by using a metallic tape, synthetic resin tape or the like as a substrate 1.

Light sources which can be used for the optical recording materials of this invention to perform recording, reproduction and erasing are gas lasers such as He-Ne, He-Cd, Ar, Kr, $CO_2$, $N_2$, HF-DF, $CD_3OH$-$13CH_3F$, CO and KrF-XeF lasers, solid lasers such as YAG and ruby glass lasers, semiconductor lasers such as GaAlAs, InGaAsP, PbSnTe-PbSSe and CdSeInSb lasers, and light sources obtained by gathering as much of the light as possible from a mercury lamp, xenon lamp, tungsten lamp or the like.

The optical information-recording methods of this invention can be variously carried out depending on the composition of $(V_2O_5)_{1-x}\cdot(M_yO_z)_x$ and the kind of additives to be intercalated, and include for example those capable of forming high-density recoding pits and/or bumps, high-density phase-transition recording spots, high-density photochromic information spots, high-density electrochromic spots and the like. When materials responsive to different wavelengths of light rays are used as intercalated or interposed between the layers of the oxides, the resulting optical recording media are capable of achieving multiple three-dimensional recording on the same recording material using a laser source emitting lasers beams of various wavelengths.

The information stored in the optical recording material of this invention can be reproduced or retrieved by conventional methods, for example those utilizing the differences in light transmittance, reflectivity, absorptivity and the like, those using as reproducing signals the differences in the amount of emitted fluorescence or phosphorescence which result from the intercalation of a fluorescent dye or oxide, those using opticomagnetic signals derived from the intercalation of a magnetic material.

According to this invention, black optical recording materials can be prepared by reducing in a reducing gas atmosphere a thin film formed on the substrate and composed of oxides of the formula $(V_2O_5)_{1-x}\cdot(M_yO_z)_x$ (wherein $M_yO_z$ and x is as defined above) having an amorphous or layer structure or thin film formed on the substrate and composed of oxides of the formula $(V_2O_5)_{1-x}\cdot(M_yO_z)_x$ having an amorphous or layer structure in which at least one of organic materials, organic metallic compounds, inorganic metallic compounds and inorganic metalloid compounds is intercalated between layers. The reduction can be carried out merely by allowing the coated substrate to stand in an atmosphere of reducing gas. Examples of reducing gas sources are those commonly used as a reducing agent such as $H_2$, $H_2S$, $NH_3$, Hi and like hydrogen and hydrides; carbon monoxide, sulfur dioxide, nitrous acid and like lower oxides; hydrazine, ethylhydrazine, and like hydrazine compounds; methylamine, dimethylamine, trimethylamine, ethylenediamine and like amines; acetaldehyde, formaldehyde and like aldehydes; formic acid, oxalic acid and like organic acids; aqueous solution of hydrogen peroxide, etc. Among them, hydrogen and hydrazine are especially preferred. The reducing gas used usually has a concentration of about 10 ppm to about 1 preferably about 20 ppm to about 0.1%. If a reducing gas having a concentration of less than 10 ppm is used, it takes a considerable time to reduce the oxides in the thin film, whereas with a reducing gas of more than 1% concentration, reduction will not proceed with improved efficiency. The reducing time varies depending on the thickness of the film, the kinds of intercalated compound, etc. but generally ranges from about 5 seconds to about 5 minutes at room temperature. The reducing time can be shortened by reducing the thin film with heating at a temperature lower than the crystallization temperature of $(V_2O_5)_{1-x}\cdot(M_yO_z)_x$.

On exposure of the recording material with the film reduced and blackened by the foregoing method to radiation of laser or like signal light, the irradiated portion of the film becomes pale yellow due to the reoxidation of the vanadium. The black film has a reflectivity of about 2 to about 5% whereas the pale yellow film portion ranges in reflectivity from about 15 to about 40% so that the latter can reproduce the stored information with a higher fidelity because of the great difference in reflectivity. Light sources useful for recording, reproducing and erasing operations include those exemplified above such as diverse lasers and light rays gathered from a mercury lamp, halogen lamp, tungsten lamp, etc.

In writing information, the reduced and blackened recording material prepared according to this invention requires an intensity of light signal commensurate with about 10 to about 2 mW/$\mu$m$^2$ in the energy of condensed beams radiated to the recording material. On the other hand, conventional optical recording media generally consume the energy of condensed beams in an amount of about 15 to about 5 mW/$\mu$m$^2$ in writing information. Therefore information writing can be performed using a smaller amount of energy according to this invention.

As is the case with the optical recording materials of this invention described hereinbefore, a primer high in absorptivity and reflectivity may be formed on or under the black film to increase the recording efficiency or a protective layer may be applied to the black film to enhance the durability.

According to this invention, it is possible to interpose an organic material between the layers of $V_2O_5$-type oxides of the formula $(V_2O_5)_{1-x}\cdot(M_yO_z)_x$ having an amorphous or layer structure which material can reduce the $V_2O_5$ oxide on decomposition or activation when heated or irradiated with laser or like signal light. In this case, when heating the thin film of $V_2O_5$-type oxides containing the reducing organic material, the $V_2O_5$ oxide which remains pale yellow in the state of oxide is reduced, whereby a black optical recording material is obtained. In the black recording material thus obtained, information can be recorded and reproduced in the same manner as in the black optical recording material prepared by use of reducing gas.

If an optical recording material with the $V_2O_5$-type oxide film containing the reducing organic material is irradiated directly with signal light, the irradiated $V_2O_5$ portion is reduced and colored black with the result that the stored information can be reproduced with a higher fidelity due to the great difference in reflectivity between the irradiated black portion and the unirradiated pale yellow portion.

Examples of the reducing organic materials are methylamine, ethylamine, aniline, monoethanolamine, diethanolamine, triethanolamine and like amines; dimethyl sulfone, diethyl sulfone and like sulfones; nitroaniline, dimethylnitrosoamine, di-isopropylnitrosoamine and like nitrosos; nitrobenzoic acid, nitroethanol, nitrotoluene, nitrophenol, naphtol yellow S and like nitros; hydrazine, ethylhydrazine, phenylhydrazine, hydrazobenzene and like hydrazines; urea, thiourea, methylurea, biuret and like ureas; ethylene glycol, propylene glycol, ethylene chlorohydrin, diethylcarbitol and like glycols; formic acid, acetic acid, oxalic acid, maleic acid, phthalic acid and like carboxylic acids; nitrocellulose, methyl cellulose, sucrose and like saccharides; hydrochlorides, sulphates, nitrates and phosphates of the organic materials, complex salts of these salts and metal ions; etc. The reducing organic material is incorporated into the film in an amount of about 0.001 to about 1 mole per mole of the $V_2O_5$ oxide. If less than 0.001 mole of the material is present, the $V_2O_5$ oxide is reduced in a lower degree, whereas with more than 1 mole, a less smooth-surfaced film tend to deposit on the substrate.

The reducing organic material can be included in the $V_2O_5$-type oxides by its addition to the solution of amorphous oxides of the formula $(V_2O_5)_{1-x}\cdot(M_yO_z)_x$.

The solution of amorphous oxides is applied to a substrate and dried in the same manner as stated above. Preferably the film is dried at a low temperature range of between room temperature and about 100° C. to prevent the decomposition of reducing organic material.

For use directly as an optical recording material, the thin film of $V_2O_5$-type oxides thus obtained is exposed to radiation of signal light in the same manner as in the nonreduced recording material.

On the other hand, when the thin film of $V_2O_5$-type oxides thus heated and blackened is used as a recording material, the thin film is first heat-treated usually at 200° to 450° C. The heat-treating temperature is determined mainly according to the composition of $(V_2O_5)_{1-x}\cdot(M_yO_z)_x$ and the kind of reducing organic material and must be higher than the decomposition temperature or activation temperature of the reducing organic material and lower than the glass transition point of $(V_2O_5)_{1-x}\cdot(M_yO_z)_x$. On heat treatment of the film, the organic material decomposes or activates to reduce the $V_2O_5$ oxide, thereby causing color change from pale yellow to black. The heat-treating time, although variable with the heat-treating temperature and the kind of the organic material, is not critically limited insofar as the film becomes black. Usually the heating time is about 0.1 to about 30 seconds. The heat treatment may be carried out at a temperature of about 600° to about 700° C. to permit the reduction of $V_2O_5$ to blacken the film at a higher rate. However, the heat treatment at such high temperature must be complete in less than 0.05 seconds to prevent the crystallization of the film. The recording material comprising a thin film thus blackened by reduction is used in the same manner as in the black recording material mentioned hereinbefore.

The recording materials of this invention and the recording methods of the invention using the recording material of the invention have a number of advantages. For example, the recording materials of this invention are uniformly smooth-surfaced, high in durability and easy and inexpensive to manufacture. Also the recording materials of the invention have an extremely low thermal conductivity and coefficient of expansion because of the presence of oxides as the matrix. The recording methods of the invention can form recording spots using a smaller amount of energy than conventional methods making information pits and bumps and methods involving a phase transition. Accordingly even when a light source generating smaller amounts of energy is used to write information, sharp information patterns can be prepared according to this invention.

The recording methods of the invention can read the stored information with a higher fidelity because of the great difference in reflectivity between the original recording mater al and its portion discolored in writing the information.

The recording materials of the invention have a data storage capacity per unit area 1.2 to 1.5 times that of the recording media prepared by PVD methods and are also higher in signal-to-noise ratio than such recording media.

The recording materials of the invention have an electroconductivity of about 1 to about $10^{-2}(\Omega.cm)^{-1}$, and are electrified in a small degree, hence low in noise.

The present invention will be described below in more detail with reference to the following Examples and Comparative Examples.

EXAMPLES 1 TO 16

$V_2O_5$ (at least 99.9% pure) and $M_yO_z$ were mixed together in the specific proportions and the mixture was melted. The melt was quenched by being sprayed over a roll rotated at a high speed, giving an amorphous material of the formula $(V_2O_5)_{1-x}.(M_yO_z)_x$ having a thin ribbon-like shape. Sixteen kinds of samples were prepared using the oxides of the composition as shown below in Table 1 under the conditions listed therein.

TABLE 1

| | Conditions for preparations of samples | | | |
|---|---|---|---|---|
| Ex. | Composition | X | Quench rate (°C./sec) | Phase structure |
| 1 | $(V_2O_5)_{1-x}.(Li_2O)_x$ | 0.50 | $\times 10^6$ | Amorphous |
| | | 0.25 | " | " |
| 2 | $(V_2O_5)_{1-x}.(MgO)_x$ | 0.50 | " | " |
| | | 0.33 | " | " |
| 3 | $(V_2O_5)_{1-x}.(TiO_2)_x$ | 0.25 | " | " |
| 4 | $(V_2O_5)_{1-x}.(Ta_2O_3)_x$ | 0.50 | " | " |
| | | 0.25 | " | " |
| 5 | $(V_2O_5)_{1-x}.(Cr_2O_3)_x$ | 0.30 | " | " |
| 6 | $(V_2O_5)_{1-x}.(MoO_3)_x$ | 0.23 | " | " |
| | | 0.80 | " | " |
| 7 | $(V_2O_5)_{1-x}.(Ag_2O)_x$ | 0.14 | " | " |
| | | 0.33 | " | " |
| 8 | $(V_2O_5)_{1-x}.(Co_2O_3)_x$ | 0.27 | " | " |
| | | 0.50 | " | " |
| 9 | $(V_2O_5)_{1-x}.(HgO)_x$ | 0.14 | " | " |
| 10 | $(V_2O_5)_{1-x}.(ZnO)_x$ | 0.25 | $\times 10^4$ | " |
| | | 0.75 | $\times 10^6$ | " |
| 11 | $(V_2O_5)_{1-x}.(B_2O_3)_x$ | 0.25 | " | " |
| | | 0.66 | " | " |
| 12 | $(V_2O_5)_{1-x}.(SiO_2)_x$ | 0.50 | " | " |
| | | 0.20 | " | " |
| 13 | $(V_2O_5)_{1-x}.(GeO_2)_x$ | 0.25 | $\times 10^7$ | " |
| | | 0.50 | $\times 10^6$ | " |
| 14 | $(V_2O_5)_{1-x}.(Bi_2O_3)_x$ | 0.25 | " | " |
| 15 | $(V_2O_5)_{1-x}.(TeO_2)_x$ | 0.30 | " | " |
| 16 | $(V_2O_5)_{1-x}.(Fe_2O_3)_x$ | 0.25 | " | " |

The amorphous material thus prepared was pulverized to a thickness of about 5 to about 10 μm and to a diameter of about 30 to about 40 μm. The particles (300 mg) were added to 10 cc of pure water and the mixture was shaken for 30 minutes and left to stand at room temperature for 3 days to obtain a solution. The undissolved amorphous material was filtered off and the filtrate was applied to a substrate of amino silicate glass. The coated substrate was dried in air at 50° C. for 30 minutes and the adsorbed water was completely removed under the conditions shown below in Table 2, thereby giving an optical recording material having a thin film of recording medium formed thereon. The removal of adsorbed water was conducted under atmospheric pressure except in Example 5.

An X-ray diffraction analysis showed that the thin films of recording media formed on the substrate had an amorphous structure. FIG. 2 shows the X-ray diffraction patterns of the recording medium films formed of the amorphous materials prepared in Examples 3, 7, 9, 11, 12 and 13. The film formed in Example 3 was observed under a scanning electron microscope to check the thickness and appearance of the film with the results as shown in FIGS. 3 and 4. As a result, it was confirmed that the film had the thicknesses as indicated below in Table 2 and were satisfactory in surface smoothness. FIG. 4 shows the uniform film formed on the glass substrate.

The optical recording materials thus obtained were tested for recording characteristics by writing information with use of a writing device employing He-Ne laser beams. Table 2 below also shows the results.

TABLE 2

| | Film-forming conditions | Film thickness | Recording by He—Ne laser | |
|---|---|---|---|---|
| Ex. | (°C. × hr) | (μm) | Formation of pit | Phase transition |
| 1 | 300° C. × 1 hr | 0.05 μm | A | A |
| | " | 0.08 μm | A | A |
| 2 | " | 0.12 μm | A | A |
| | " | 0.20 μm | | |
| 3 | " | 0.07 μm | A | A |
| 4 | " | 0.1 μm | | A |
| | " | 0.05 μm | | A |
| 5 | 50° C. × 1 hr ($2 \times 10^{-2}$ torr) | 0.08 μm | A | |
| 6 | 150° C. × 1 hr | 0.07 μm | A | A |
| | " | 0.1 μm | A | A |
| 7 | " | 0.05 μm | A | A |
| | " | 0.1 μm | A | A |
| 8 | " | 0.06 μm | | A |
| | " | 0.1 μm | | A |
| 9 | " | 0.08 μm | A | A |
| 10 | 100° C. × 1 hr | 0.06 μm | | |
| | " | 0.13 μm | | A |
| 11 | " | 0.07 μm | A | |
| | 300° C. × 1 hr | 0.1 μm | A | |
| 12 | " | 0.12 μm | A | |
| | " | 0.06 μm | A | |
| 13 | " | 0.1 μm | A | |
| | " | 0.17 μm | A | |
| 14 | " | 0.1 μm | | A |
| 15 | " | 0.1 μm | | A |
| 16 | " | 0.5 μm | | A |

The mark A in Table 2 above shows the pits and phase transition rated as proper for recording.

The groove width of the pits which varied with the change in output of He-Ne laser on the film was measured in respect of the optical recording material comprising the oxides of the composition $(V_2O_5)_{0.75}.(GeO_2)_{0.25}$ and prepared in Example 13. Table 3 below shows the results.

TABLE 3

| Output of laser (mW) | Groove width of pit (μm) |
|---|---|
| 2 | 0.5–0.6 |
| 5 | 0.8–1.0 |
| 7 | 1.5–1.8 |
| 10 | 2.5–2.8 |
| 30 | 10–30 |
| 40 | 30–50 |

FIG. 10 shows the difference between the light transmittance (indicated at Tam, %) of amorphous phase-containing thin films prepared by heat-treating at 100° C. for 30 minutes the thin films of oxides obtained respectively in Example 2 (x=0.33), Example 3 (x=0.25), Example 5 (x=0.30), Example 11 (x=0.25), Example 12 (x=0.20) and Example 13 (x=0.25) on one hand and the light transmittance (indicated at Tcryst, %) of crystalline phase-containing thin films prepared by heat-treating at 450° C. for 30 minutes those of the same kinds as above on the other hand.

COMPARATIVE EXAMPLES 1 TO 16

Aqueous solutions of oxides identical in composition with those in Examples 1 to 16 but having a crystal structure were prepared, applied to substrates and dried in the same manner as in Examples 1 to 16.

The films thus formed were all found to be poor in surface smoothness and cellular and to have hair cracks and fine crystal grains interspersed therein, hence useless as optical information-recording materials.

Figure 1:
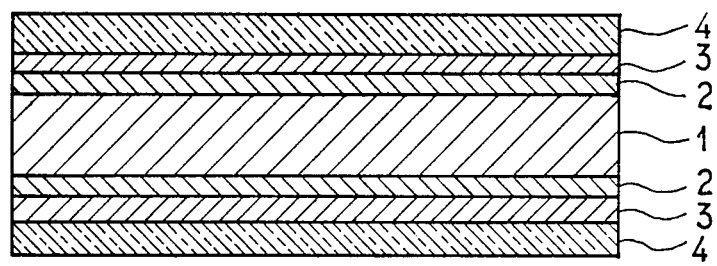
Figure 2:
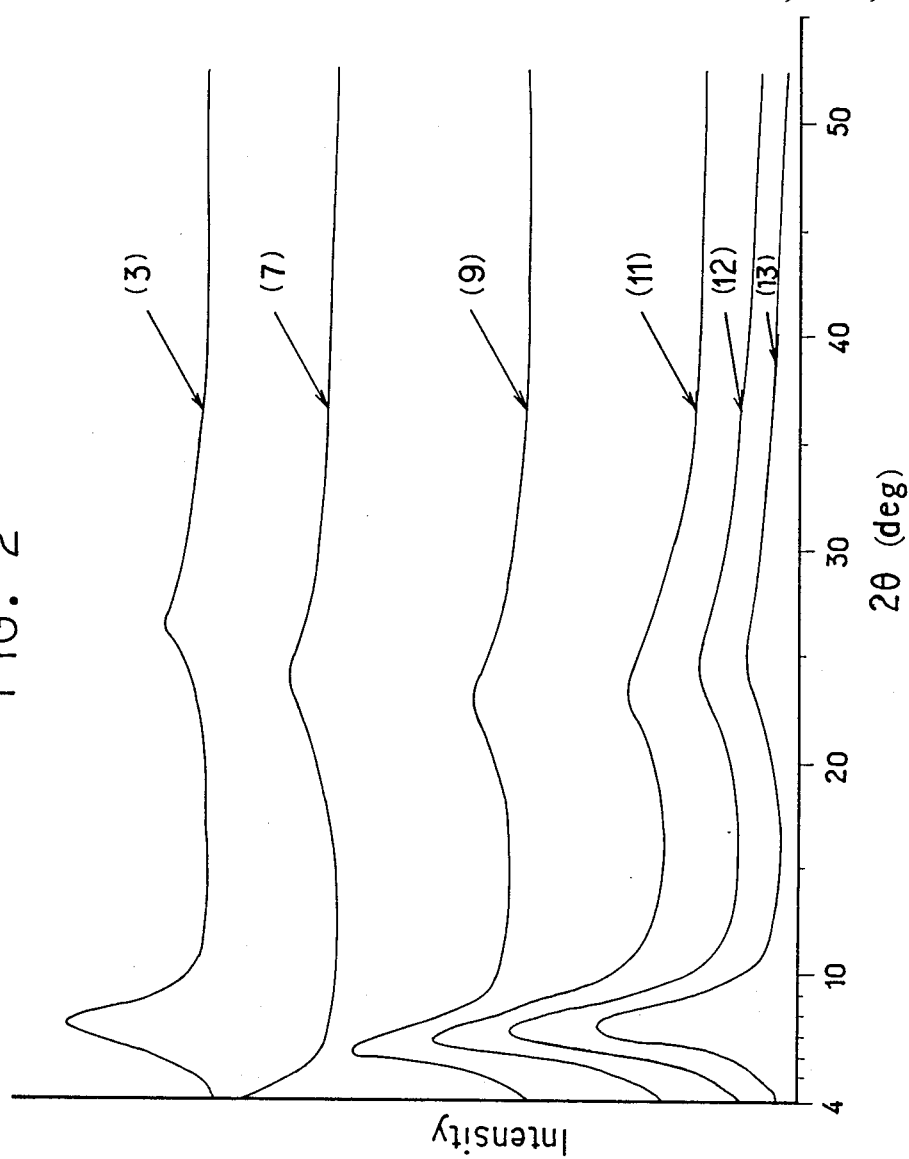
Figure 4:
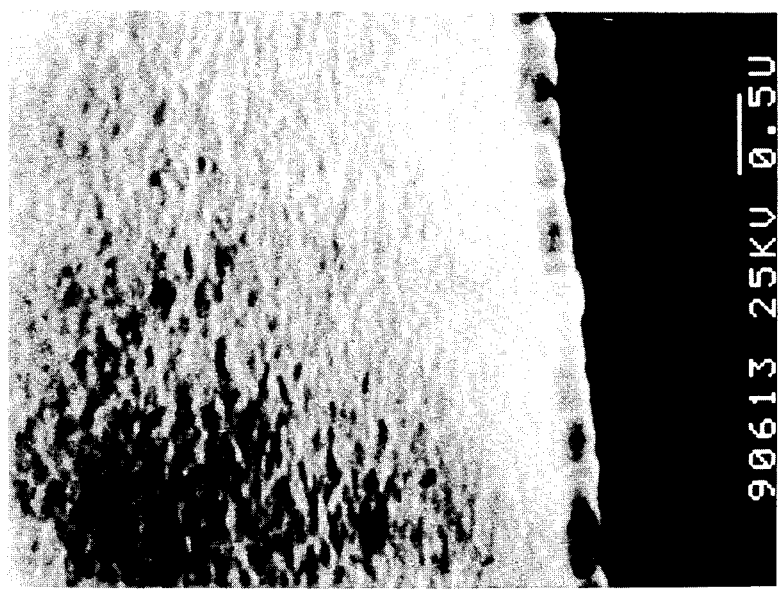
Figure 3:
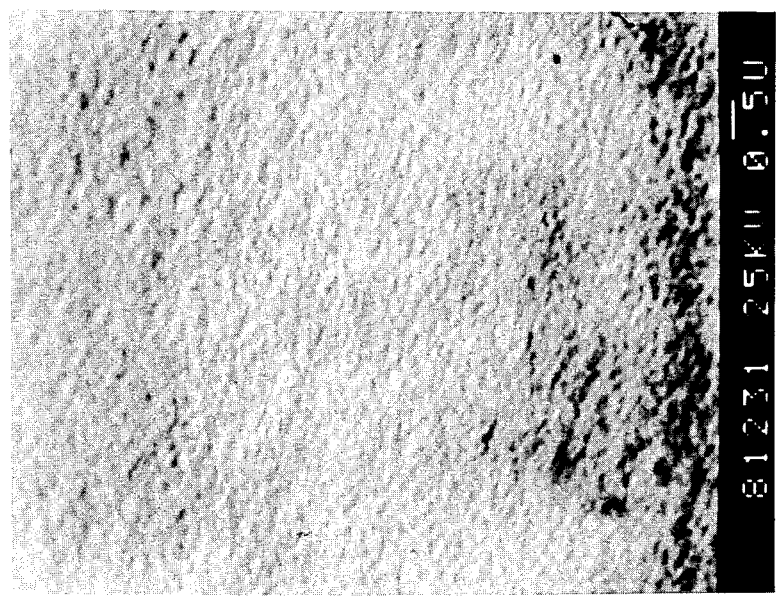
Figure 6:
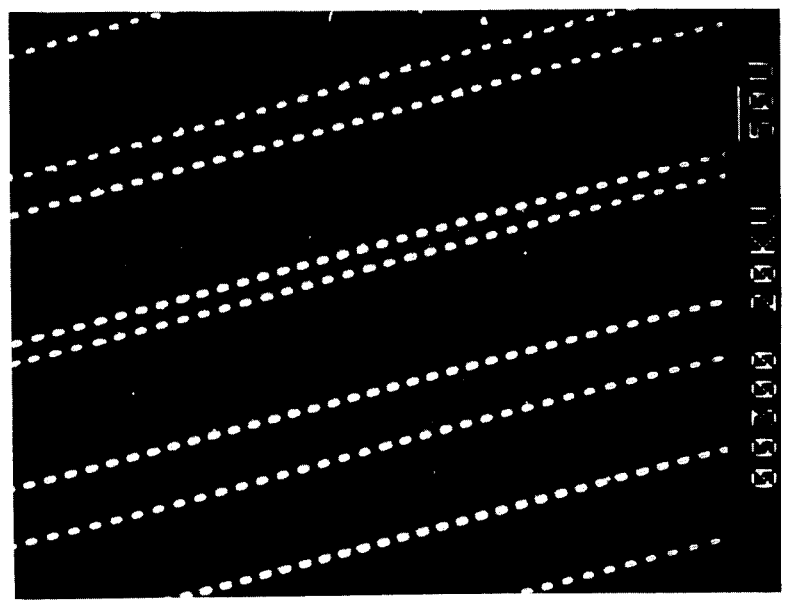
FIG. 6 is an electron micrograph (150 X) showing the pits formed in writing information in the optical recording material of Example 13 comprising $(V_2O_5)_{0.50}.(GeO_2)$ by irradiation with a semiconductor laser (850 nm in wavelength and 15 mW in output).
Figure 5:
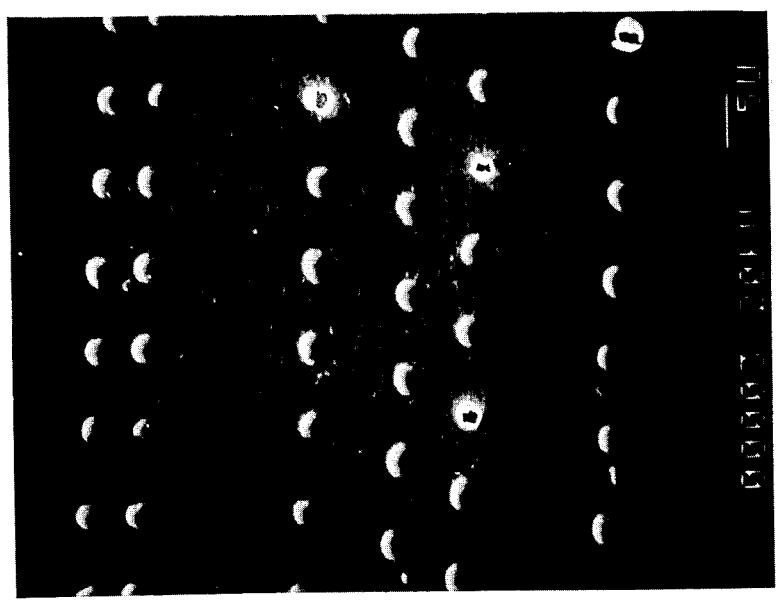
FIG. 5 is an electron micrograph at a magnification of 1500 X showing the bumps formed in writing information in the optical recording material of Example 3 comprising $(V_2O_5)_{0.75}.(TiO_2)_{0.25}$ by irradiation with He-Ne laser (633 nm in wavelength and 7 mW in output).
Figure 8:
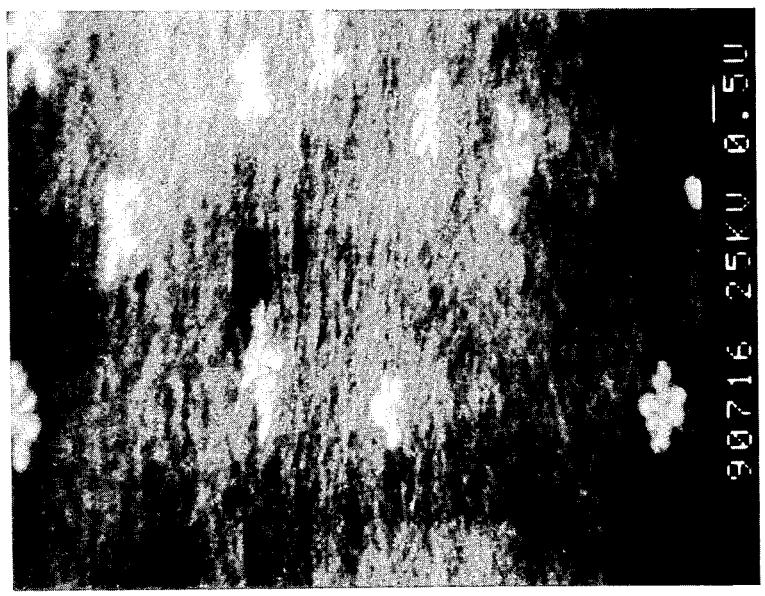
FIG. 8 is an electron micrograph (10000 X) showing the pits formed in writing information in the optical recording material of Example 5 comprising $(V_2O_5)_{0.70}.(Cr_2O_3)_{0.30}$ by irradiation with He-Ne laser (15 mW in output).
Figure 7:
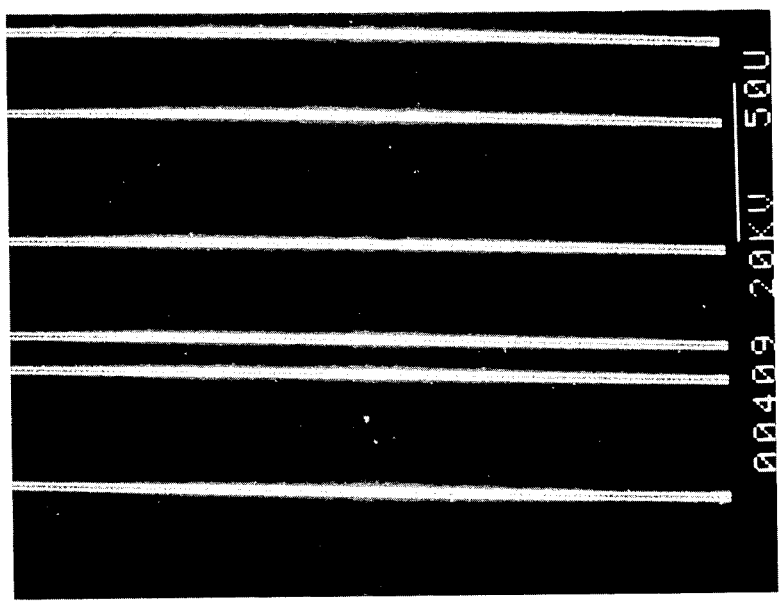
FIG. 7 is an electron micrograph (450 X) showing the pits formed in writing information in the optical recording material of Example 9 comprising $(V_2O_5)_{0.86}.(HgO)_{0.14}$ by irradiation with Ar laser (450 nm in wavelength and 20 mW in output).
Figure 11:
Figure 9:
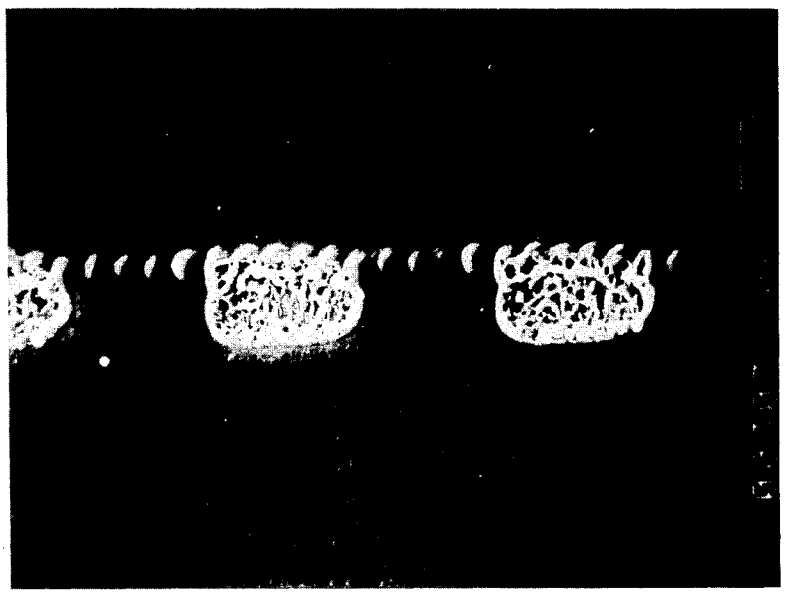
FIG. 9 is an electron micrograph (2000 X) showing the pits formed in writing information in the optical recording material of Example 12 comprising $(V_2O_5)_{0.80}.(SiO_2)_{0.20}$ by irradiation with pulse laser (10 $\mu$s and 1 $\mu$s) at 7 mW output.

FIG. 11 shows an electron micrograph (10000 X) of the film prepared from $(V_2O_5)_{0.75}.(TiO_2)_{0.25}$ (Comparative Example 3).

REFERENCE EXAMPLE 1

Figure 12:
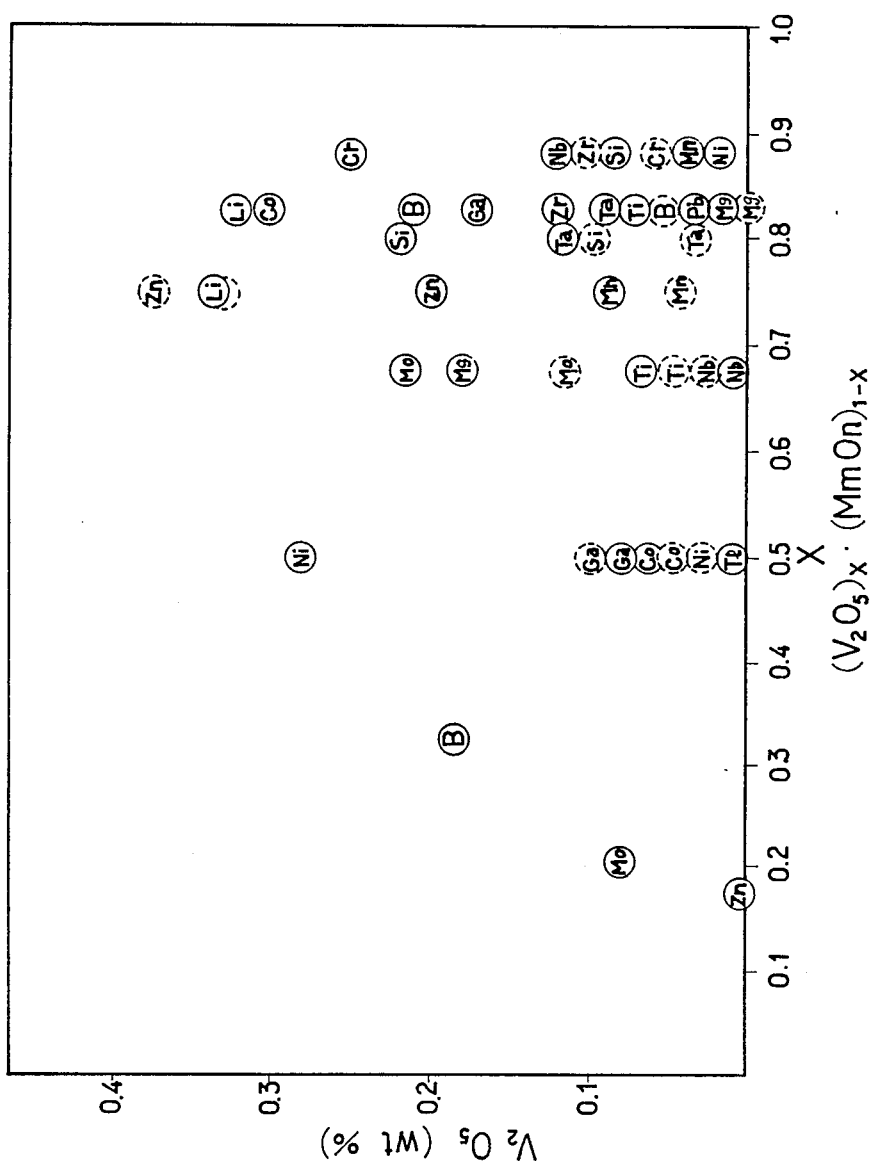

Amorphous and crystalline materials of the formula $(V_2O_5)_x.(M_yO_z)_{1-x}$ were pulverized to a diameter of 30 to 40 $\mu$m and to a thickness of 5 to 10 $\mu$m. The powder thus obtained (300 mg) was added to 10 cc of pure water and the mixture was shaken for 30 minutes and left to stand at room temperature for 3 days to obtain a solution. The amount of the vanadium present in the solution was measured by analysis according to atomic absorption method. FIG. 12 shows the results obtained. The value x in the material of $(V_2O_5)_x.(M_yO_z)_{1-x}$ is plotted as abscissa in the graph. The symbols in the graph indicate the elements represented by M. The circles drawn in a solid line show the amount of the dissolved amorphous material containing the element in the circle, and the circles in a broken line the amount of the dissolved crystalline material containing the element in the circle.

Figure 13:
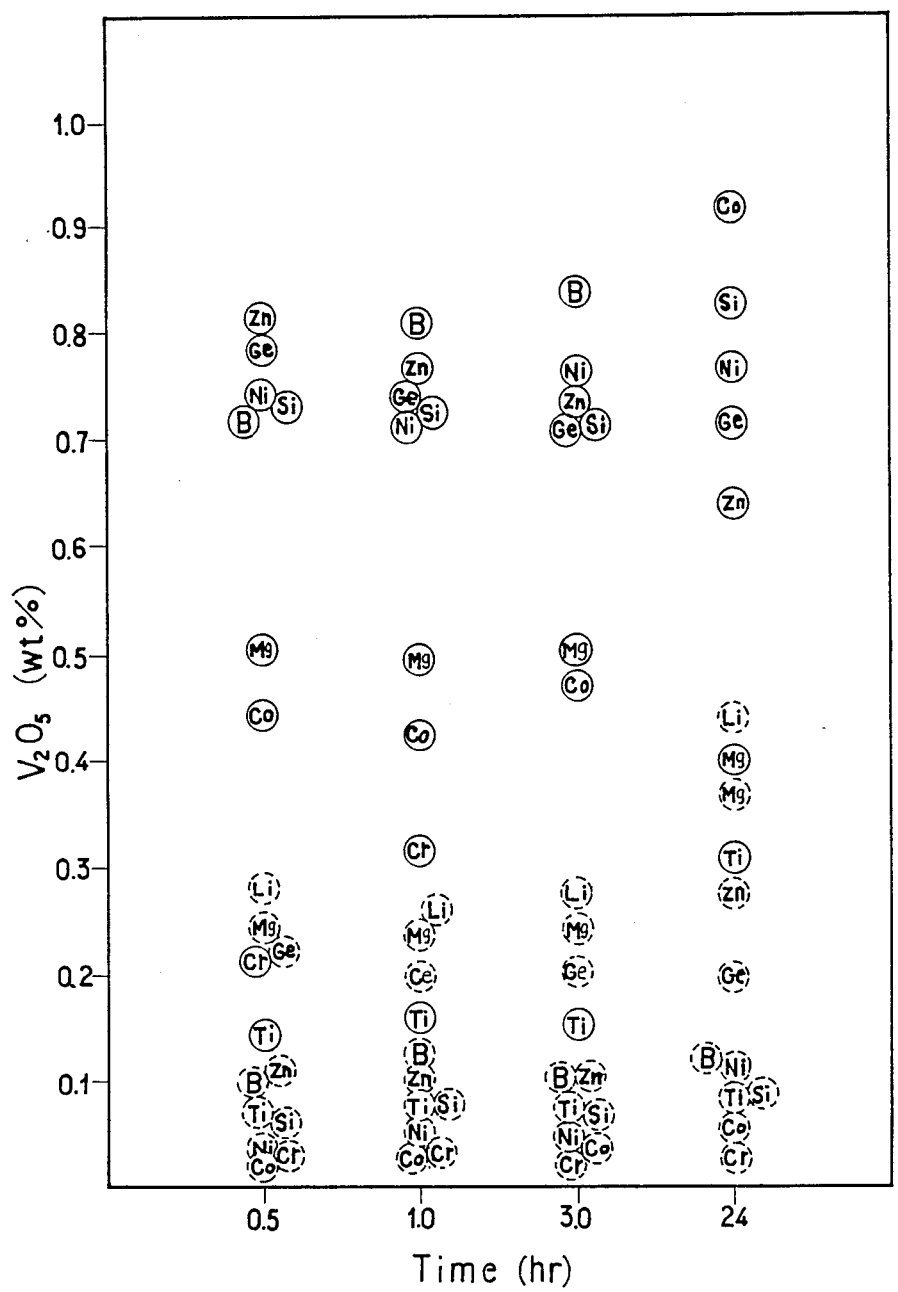
Figure 14:
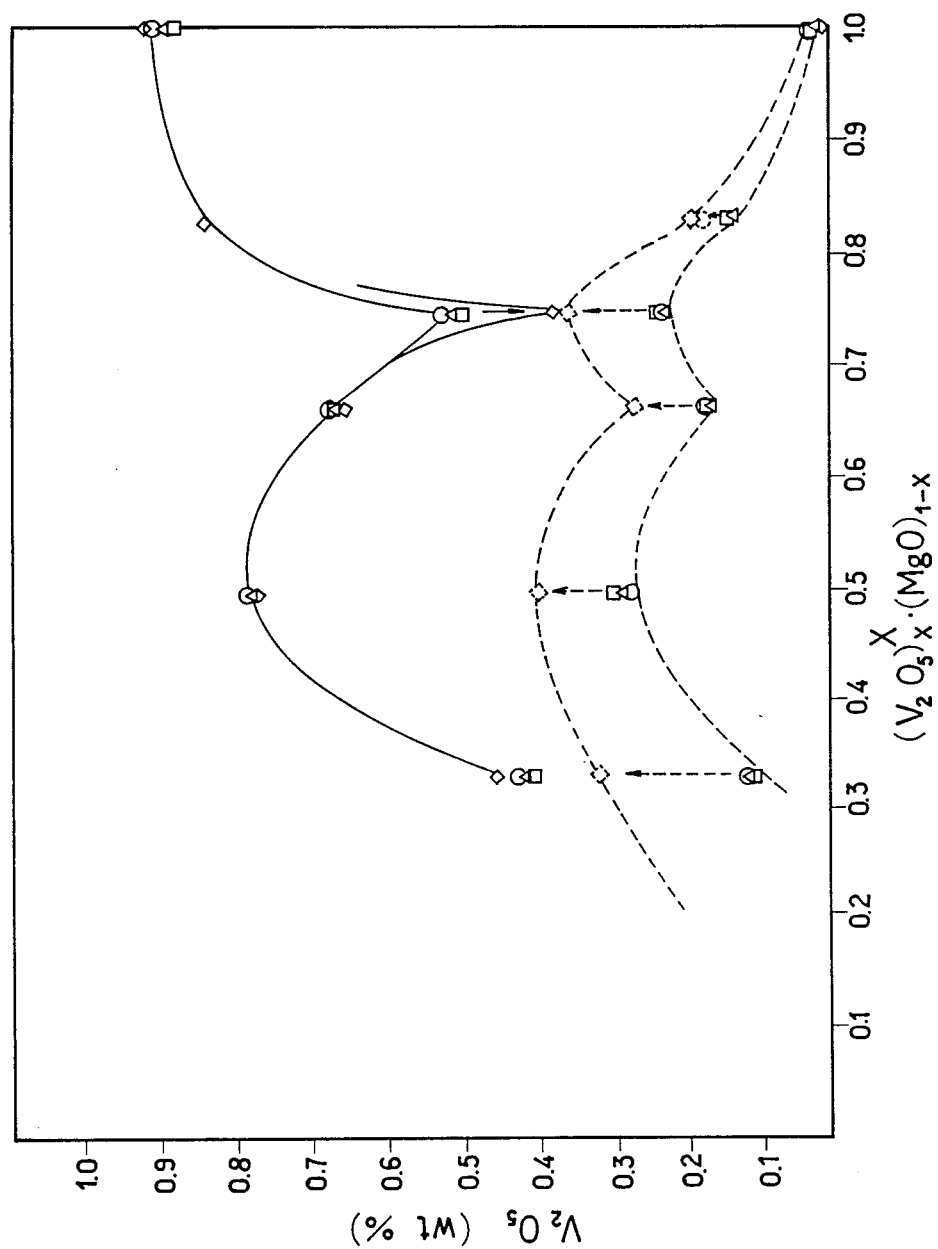
Figure 15:
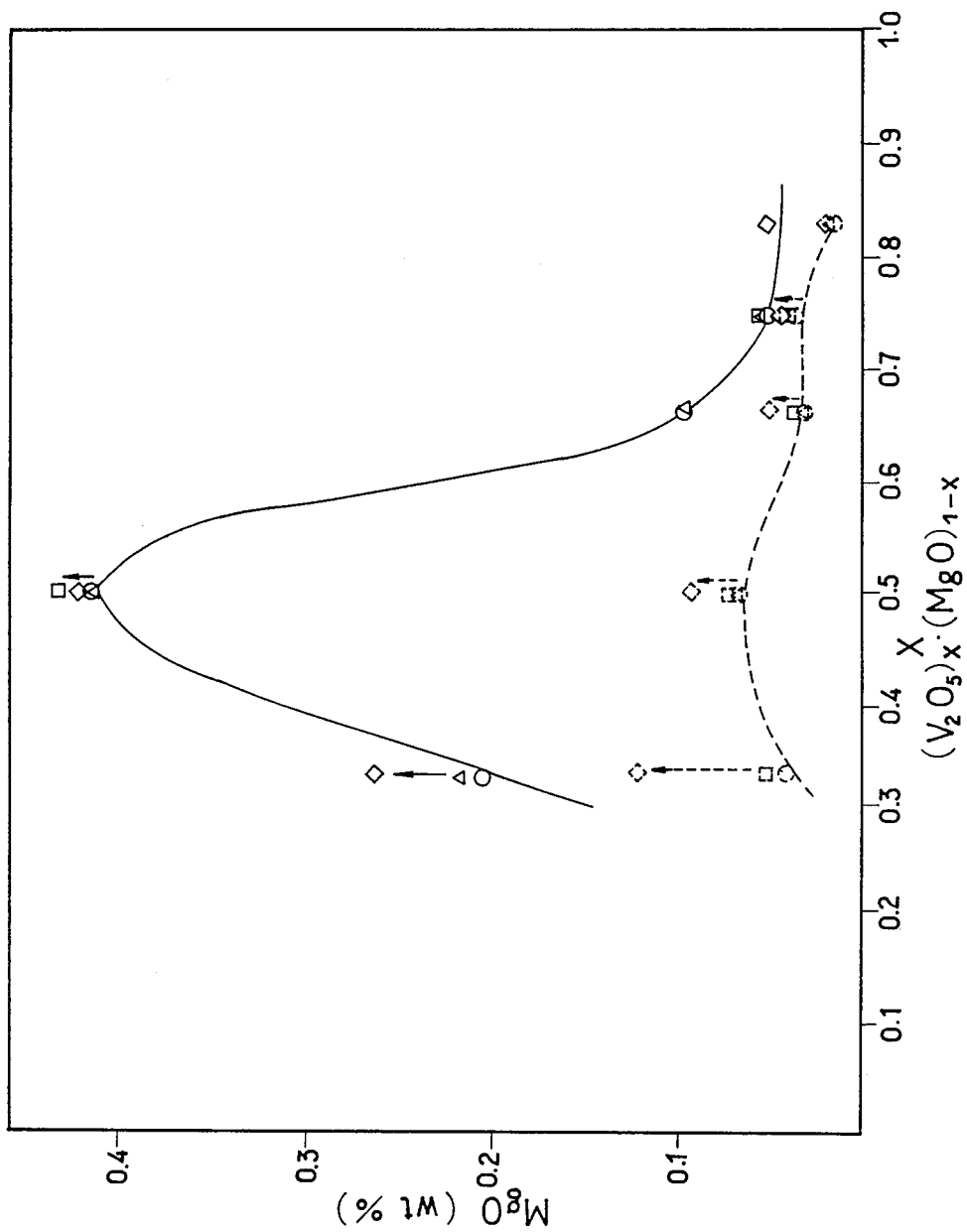
Figure 16:
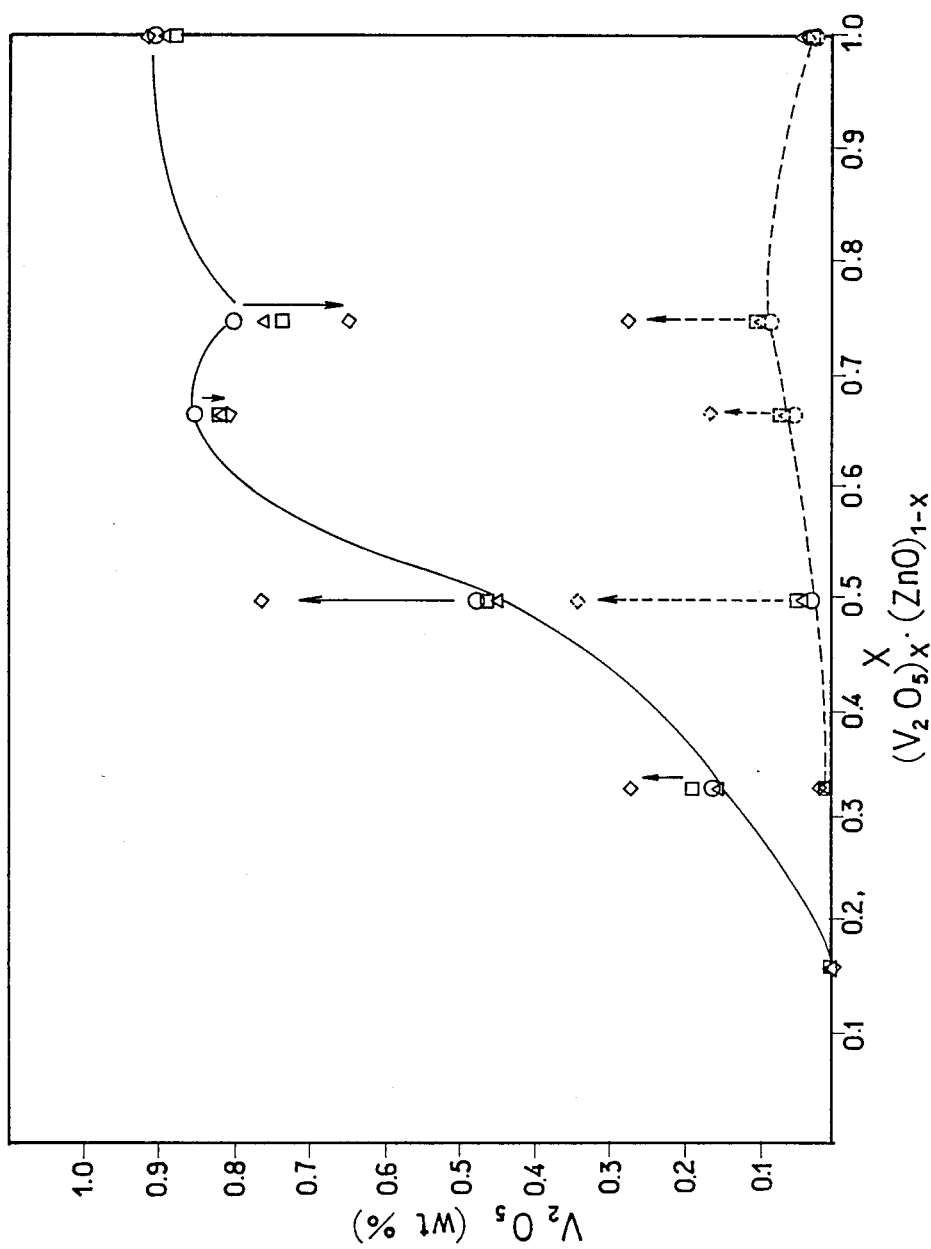
Figure 17:
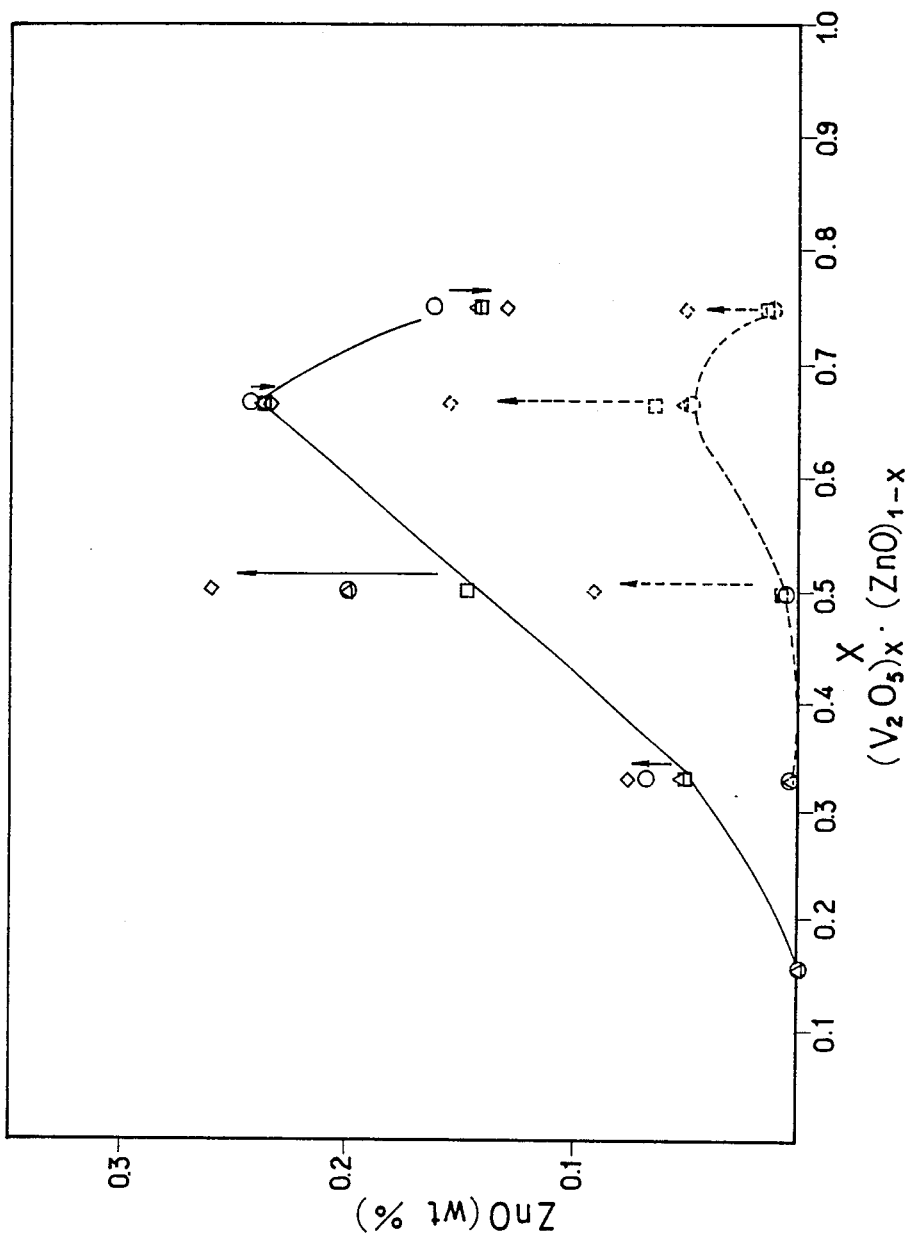

The amount of dissolved $V_2O_5$ (x=0.75) from various oxides varying with time was measured at specific intervals in the same manner as above with the results shown in FIG. 13. The symbols in FIG. 13 represent the same elements as those in FIG. 12. FIGS. 12 and 13 show that the amorphous material has a high solubility.

REFERENCE EXAMPLE 2

The amounts of dissolved materials of the formulae $(V_2O_5)_x.(MgO)_{1-x}$ and $(V_2O_5)_x.(ZnO)_{1-x}$ which varied with time were measured at specific intervals in the same manner as in Reference 1. The results are shown in FIGS. 14 to 17 in which the mark ○ represents the amount of dissolved material after 30 minutes, the mark Δ the amount thereof after 1 hour, the mark □ the amount thereof after 3 hours and the mark ◇ the amount thereof after 24 hours. The curves drawn in a solid line indicate the dissolved amounts of amorphous material and the curves in a broken line the dissolved amounts of crystalline material. The value x is plotted as abscissa and the dissolved amounts of $V_2O_5$, MgO and ZnO are plotted as ordinate in the graph.

Figure 18:
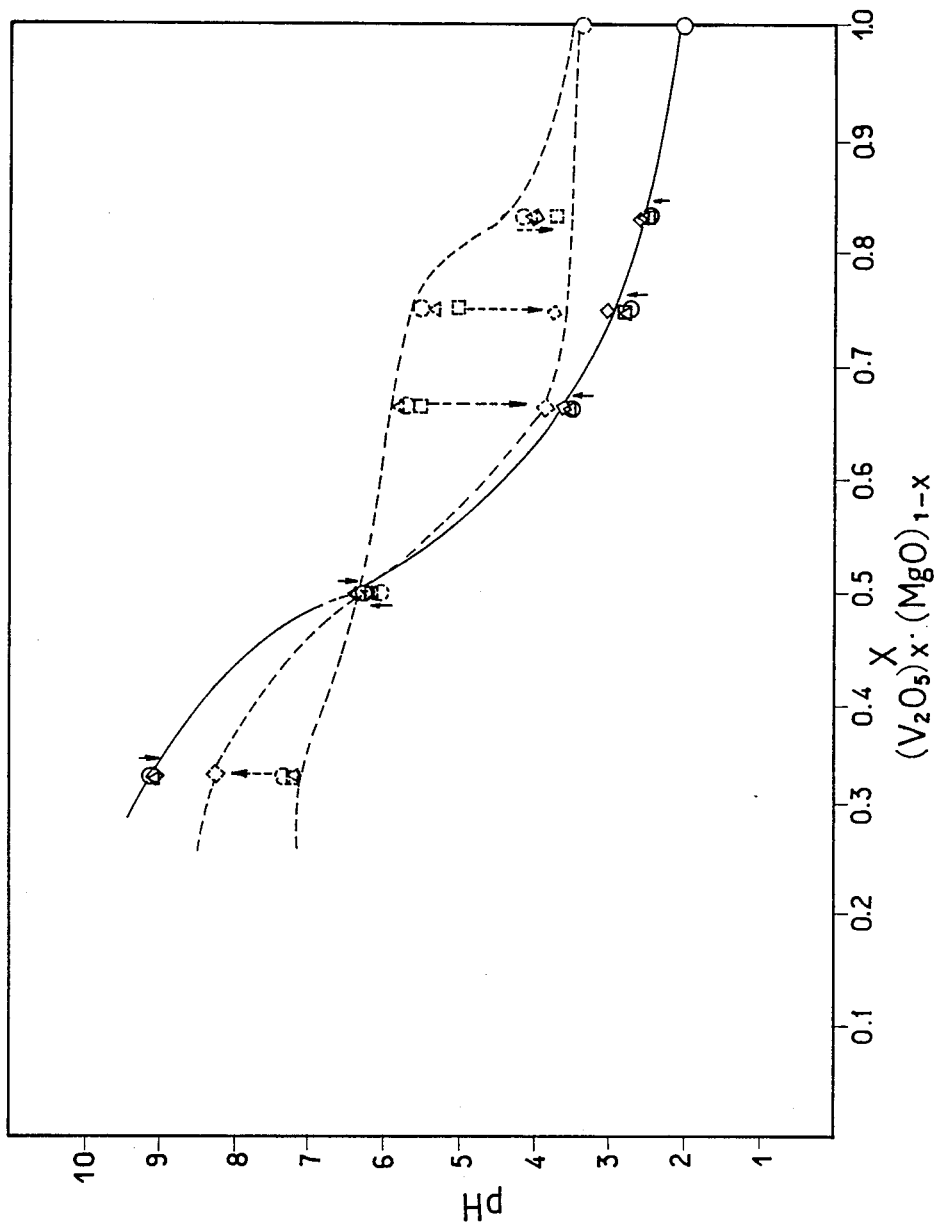

FIG. 18 is a graph showing the change in pH of the solution of $(V_2O_5)_x.(MgO_z)_{1-x}$ the dissolved amount of which was measured by the foregoing method. The value x is plotted as abscissa in the graph. In the graph, the mark ○ indicates the pH value after 30 minutes, the mark Δ the pH value after 1 hour, the mark □ the pH value after 3 hours, and the mark ◇ the pH value after 24 hours. The curve in a solid line represents the pH value of the amorphous material and the curves in a broken line the pH value of the crystalline material. FIG. 18 reveals that the solution of amorphous material shows substantially no variation in pH and remains stable for a prolonged period of time.

REFERENCE EXAMPLE 3

A colloidal aqueous solution of amorphous material of $(V_2O_5)_{0.75}$ $(GeO_2)_{0.25}$ was formed into a thin film according to this invention. In this way, six samples were prepared, dried at room temperature and heat-treated under the undermentioned conditions.

Figure 19:
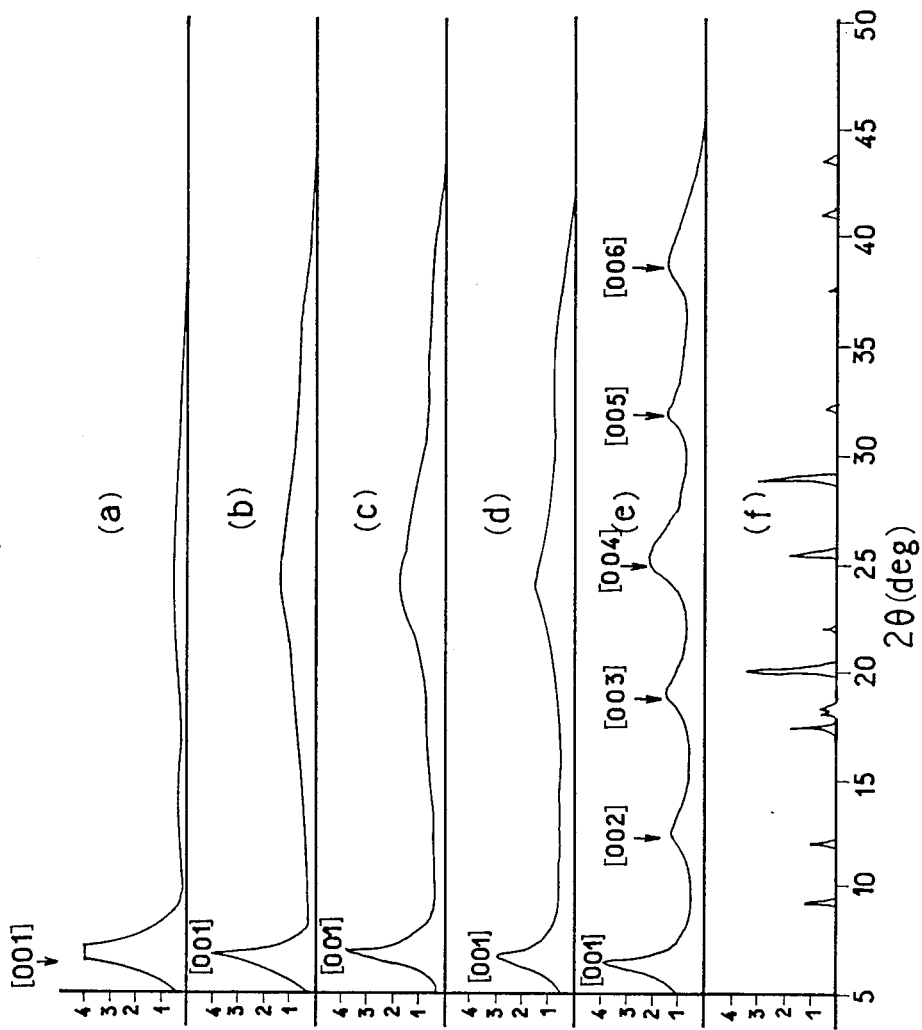

FIGS. 19 (a), (b), (c) and (d) show the X-ray diffraction patterns of the films thus obtained and heat-treated respectively at 50° C., 100° C., 200° C. and 300° C., each for 30 minutes with the index of planes indicated in the parentheses.

FIG. 19 (e) shows the X-ray diffraction pattern of the film heat-treated at 350° C. for 30 minutes and reveals that the product is an layer compound.

FIG. 19 (f) displays the X-ray diffraction pattern of the film heat-treated at 450° C. for 30 minutes and indicates that the film is crystallized.

Figure 20:
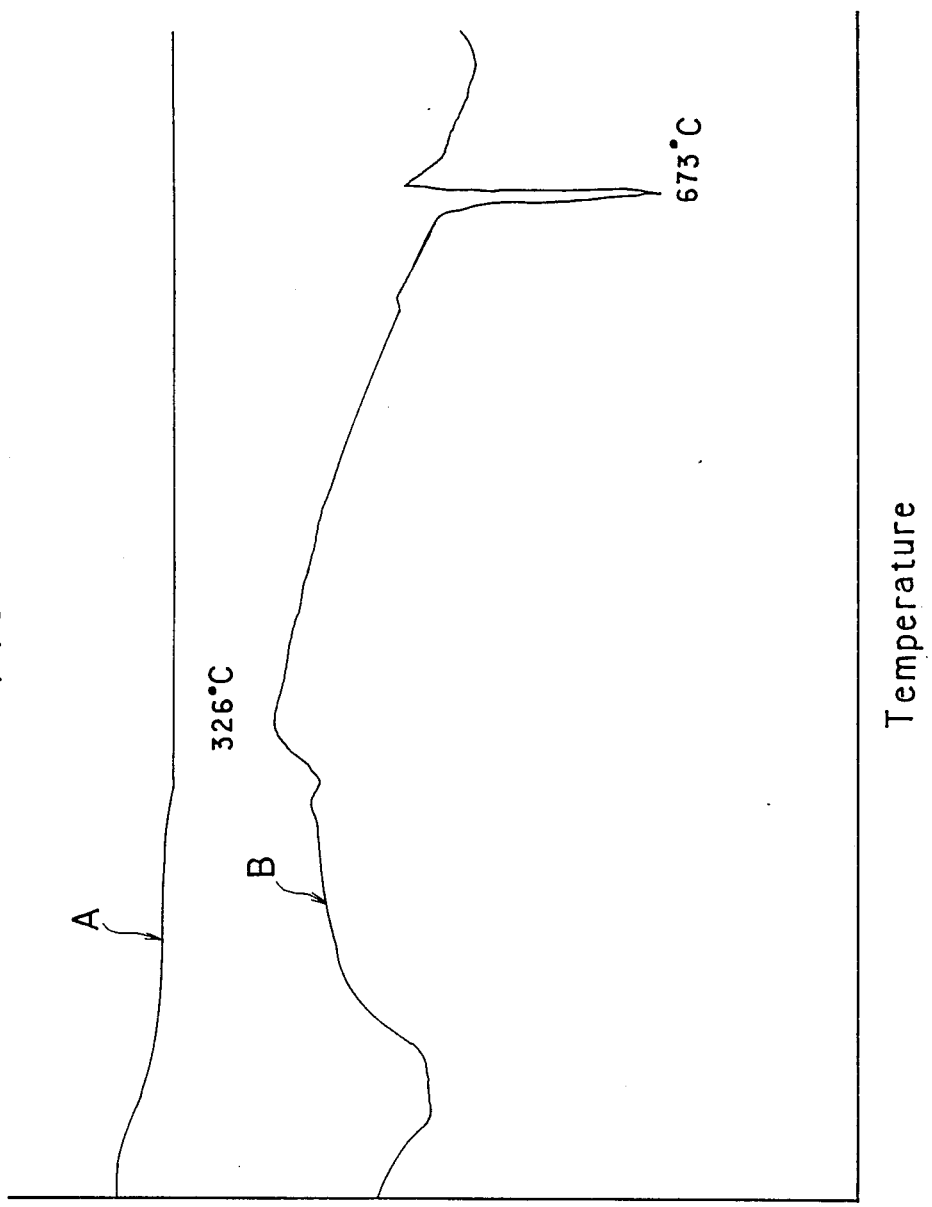

A thin film of amorphous material of $(V_2O_5)_{0.70}.(Cr_2O_3)_{0.30}$ was analyzed. FIG. 20 shows the result of differential thermal analysis which is designated A and the result of thermogravimetric analysis which is marked B. The evolution of heat at 326° C. is presumably caused by crystallization.

FIGS. 19 and 20 show that the film of amorphous material of $(V_2O_5)_{0.75}.(GeO_2)_{0.25}$ and that of amorphous material of $(V_2O_5)_{0.70}.(Cr_2O_3)_{0.30}$ undergo, when heated, a phase transition which can be utilized in writing information by irradiation with laser beams or the like.

EXAMPLE 17

A mixture of $V_2O_5$ and $TiO_2$ in a $V_2O_5/TiO_2$ mole ratio of 3:1 was thermally melted and the melt was poured into a 5 wt % aqueous solution of $ZnCl_2$ to quench and dissolve the melt at the same time, thereby giving a 0.5 wt % solution of $(V_2O_5)_{0.75}\cdot(TiO_2)_{0.25}$.

The solution thus obtained was applied to a glass substrate and dried in an atmosphere at 200° C. for 1 hour to form a smooth-surfaced, uniform thin film 0.2 μm in thickness. An X-ray diffraction analysis shows that the film had an amorphous structure.

EXAMPLE 18

A material of $V_2O_5$ was thermally melted and the melt was poured into water to quench and dissolve the melt at the same time, giving a 1 wt % aqueous solution. To the solution was added a 0.1 wt % solution of C.I. Acid Blue 7 (product of Sumitomo Chemical Co., Ltd., Japan, available under a trademark "Solar pure blue AFX") in an amount of 0.1 mole per mole of $V_2O_5$, calculated as the dye. The mixture was stirred and the impurities were filtered off. The filtrate was applied to a glass substrate and dried in air at 100° C. for 1 hour and analyzed by X-ray diffraction. The analysis confirmed that the film thus obtained had an amorphous structure.

The film was heat-treated at a temperature near a glass transition temperature, i.e. 200° C. for 30 minutes and analyzed by X-ray diffraction. The analysis revealed that there existed a layer compound arranged in the direction of c axis with a spacing of 14.75 Å between (001) lattice planes. Since there was a spacing of 8.75 Å between lattice planes in the film formed of $V_2O_5$ alone and heat-treated in the same manner as above, clearly the dye was intercalated between the layers in the film prepared in Example 18.

EXAMPLE 19

A thin film was formed on a glass substrate in the same manner as in Example 18 with the exception of adding a 0.1 wt % solution of bis(diiminosuccinonitrilo)-nickel complex in a ratio of 0.1 mole per mole of the $V_2O_5$, calculated as the Ni complex, to the 1 wt % aqueous solution of $V_2O_5$.

A spacing of 14.85 Å was formed between (001) lattice planes with the layer compound of the film prepared by heat treatment at 200° C. for 30 minutes and thus the bis(diiminosuccinonitrilo)-nickel complex was found to be intercalated between the layers.

EXAMPLE 20

The oxides of $(V_2O_5)_{0.75}\cdot(TiO_2)_{0.25}$ were thermally melted and rendered amorphous by instant quench and 0.1 wt % of the amorphous oxides was dissolved in a 0.05 wt % aqueous solution of Cu-phthalocianine-type dye ("Olesole First Blue," trademark, product of Sumitomo Kagaku Kabushiki Kaisha, Japan) which is optically effective. The aqueous solution was applied by a spinner (1200 rpm, 5 sec) to a glass substrate and was dried at 150° C. for 30 minutes. The film was uniform and smooth-surfaced and had a thickness of 0.1 μm. Epoxy resin was applied to the coated surface by a spinner (3000 rpm, 3 sec) and cured at room temperature.

Figure 21:
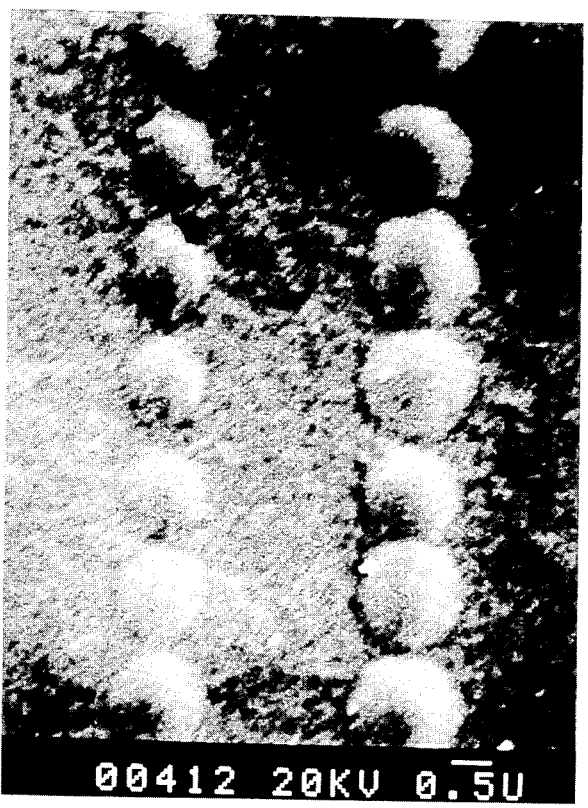

Information was written with He-Ne laser beams at an output of 5 mW and modulated pulse frequency of 100 KHz using an objective lens 0.45 in numerical aperture $N_A$ and beams 1 μm in diameter, producing sharp bumps having a width of 0.8 μm. FIG. 21 is an optical micrograph (10000 X) showing the surface of the optical recording medium thus obtained.

EXAMPLES 21 TO 36

An oxide of $V_2O_5$ (more than 99.9% pure) and the other oxide of $M_yO_z$ were mixed in the specified proportions and thermally melted. The melt was sprayed over the surface of a roll rotated at a high speed to achieve quench, thereby producing an amorphous material of $(V_2O_5)_{1-x}\cdot(M_yO_z)_x$ having a shape resembling a thin ribbon. In this way, 16 kinds of samples were prepared with the composition as shown below in Table 3 under the condition listed therein for preparation of the samples.

TABLE 1

| | Conditions for preparation of samples | | | |
|---|---|---|---|---|
| Ex. No. | Composition | X | Quench rate (°C./sec) | Phase structure |
| 21 | $(V_2O_5)_{1-x}\cdot(Li_2O)_x$ | 0.25 | $\times 10^6$ | Amorphous |
| 22 | $(V_2O_5)_{1-x}\cdot(MgO)_x$ | 0.14 | " | " |
| 23 | $(V_2O_5)_{1-x}\cdot(TiO_2)_x$ | 0.25 | " | " |
| 24 | $(V_2O_5)_{1-x}\cdot(Ta_2O_3)_x$ | 0.25 | " | " |
| 25 | $(V_2O_5)_{1-x}\cdot(Cr_2O_3)_x$ | 0.30 | " | " |
| 26 | $(V_2O_5)_{1-x}\cdot(MoO_3)_x$ | 0.23 | " | " |
| 27 | $(V_2O_5)_{1-x}\cdot(MnO_2)_x$ | 0.14 | " | " |
| 28 | $(V_2O_5)_{1-x}\cdot(Co_2O_3)_x$ | 0.27 | " | " |
| 29 | $(V_2O_5)_{1-x}\cdot(NiO)_x$ | 0.14 | " | " |
| 30 | $(V_2O_5)_{1-x}\cdot(ZnO)_x$ | 0.25 | $\times 10^4$ | " |
| 31 | $(V_2O_5)_{1-x}\cdot(B_2O_3)_x$ | 0.66 | $\times 10^6$ | " |
| 32 | $(V_2O_5)_{1-x}\cdot(SiO_2)_x$ | 0.20 | " | " |
| 33 | $(V_2O_5)_{1-x}\cdot(GeO_2)_x$ | 0.25 | $\times 10^6$ | Amorphous |
| 34 | $(V_2O_5)_{1-x}\cdot(Bi_2O_3)_x$ | 0.25 | " | " |
| 35 | $(V_2O_5)_{1-x}\cdot(TeO_2)_x$ | 0.14 | " | " |
| 36 | $(V_2O_5)_{1-x}\cdot(Fe_2O_3)_x$ | 0.14 | " | " |

Aqueous solutions were formulated in the same manner as in Examples 1 to 16 using the amorphous materials thus obtained. The solutions were applied to a silica glass substrate, dried at 50° C. in air for 30 minutes and heated under the conditions shown below in Table 4 to completely remove the adsorbed water, thereby forming a thin film on the substrate. The heat was applied under atmospheric pressure except in Example 25.

An X-ray diffraction analysis showed that the films formed on the substrates had an amorphous structure.

TABLE 4

| Example | Film-forming conditions (°C. × hr) | Film thickness(μm) |
|---|---|---|
| 21 | 300° C. × 1 hr | 0.20 |
| 22 | " | 0.12 |
| 23 | " | 0.10 |
| 24 | " | 0.15 |
| 25 | 50° C. × 1 hr ($2 \times 10^{-2}$ torr) | 0.20 |
| 26 | 150° C. × 1 hr | 0.11 |
| 27 | " | 0.08 |
| 28 | " | 0.10 |
| 29 | " | 0.05 |
| 30 | 100° C. × 1 hr | 0.10 |
| 31 | 300° C. × 1 hr | 0.11 |
| 32 | " | 0.09 |
| 33 | " | 0.10 |
| 34 | " | 0.07 |
| 35 | " | 0.05 |
| 36 | " | 0.07 |

The film thus formed on the substrate was reduced in an atmosphere of reducing gas at room temperature, giving an optical recording material having a black recording medium layer. The optical recording material was irradiated with He-Ne laser beams (beam diameter 1.0 μm, output 7 mW) to form pale yellow portions corresponding to bits. Table 5 shows the reducing conditions and the size of the pale yellow portions corresponding to bits.

included in the layer compound of $V_2O_5$. The film was irradiated with He-Ne laser beams in the same manner as in Examples 21 to 36, whereby pale yellow portions corresponding to bits were precisely and easily formed. Table 5 shows the reducing conditions and the size of the pale yellow portions.

TABLE 5

| Ex. No. | Conditions for reducing gas treatment | | Size of portion corresponding to bit (μm, width × length) |
|---|---|---|---|
| | Reducing gas | Concentration of reducing gas(ppm) | Treating time(sec) | |

| Ex. No. | Reducing gas | Concentration of reducing gas(ppm) | Treating time(sec) | Size of portion corresponding to bit (μm, width × length) |
|---|---|---|---|---|
| 21 | $H_2S$ | 100 | 60 | 0.9 × 2.5 |
| 22 | $SO_2$ | 1000 | " | " |
| 23 | $N_2H_4$ | 10 | " | " |
| 24 | $CH_3NH_2$ | 100 | " | " |
| 25 | HCHO | 50 | " | " |
| 26 | HCOOH | 50 | " | " |
| 27 | $H_2O_2$ | 100 | " | " |
| 28 | $N_2H_4$ | 100 | 30 | " |
| 29 | " | " | 20 | " |
| 30 | " | " | 10 | " |
| 31 | " | " | 5 | " |
| 32 | " | " | 1 | " |
| 33 | " | " | 10 | " |
| 34 | " | " | " | " |
| 35 | $N_2H_4$ | 100 | 10 | 0.9 × 2.5 |
| 36 | " | " | " | " |
| 37 | " | " | " | " |
| 38 | " | " | " | " |
| 39 | $H_2$ | 3 atm | 15 min | " |

EXAMPLE 37

On a glass substrate was formed, in the same manner as in Example 17, a thin film (0.12 μm thick) of the composition $(V_2O_5)_{0.75}.(TiO_2)_{0.25}$ having a uniform amorphous structure. The film was reduced at room temperature to give an optical recording material with a black recording medium layer. Pale yellow portions corresponding to bits were precisely and easily produced over the recording material thus prepared on exposure to radiation of He-Ne laser beams in the same manner as in Examples 21 to 36. Table 5 shows the reducing conditions and the size of the pale yellow portions corresponding to bits.

EXAMPLE 38

The general procedure of Example 18 was repeated, producing on a glass substrate a thin film (0.10 μm thick) having a homogeneously amorphous structure in which C.I. Acid Blue 7 was interposed in the layer compound of $V_2O_5$. The film was reduced at room temperature, giving an optical recording material with a black recording medium layer. On irradiation with He-Ne laser beams in the same manner as in Examples 21 to 36, pale yellow portions corresponding to bits were precisely and easily formed. Table 5 shows the reducing conditions and the size of the pale yellow portions corresponding to bits.

EXAMPLE 39

The general procedure of Example 19 was repeated, producing on a glass substrate a thin film (0.09 μm thick) having a homogeneous amorphous structure in which the bis(diiminosuccinitrilo)-nickel complex was

EXAMPLES 40 TO 53

A mixture of $V_2O_5$ and $GeO_2$ in a $V_2O_5/GeO_2$ mole ratio of 3:1 was thermally melted and the melt was sprayed over a high-speed rotating roll to quench it at a rate of $10^{6°}$ C./sec, thereby giving an amorphous material of the composition $(V_2O_5)_{0.75}.(GeO_2)_{0.25}$ having a thin ribbon-like shape. The amorphous material thus obtained was pulverized to a thickness of about 5 to about 10 μm and to a diameter of about 30 to about 40 μm. The powder was dissolved in pure water to obtain a 3 wt % solution to which the organic material as shown below in Table 6 was added in a concentration of organic material of 1% by weight. In this way, 14 kinds of solutions were prepared.

Each of the solutions thus prepared was applied to a glass substrate by a spinner (150 rpm and 30 sec in first application and 1000 to 2000 rpm and 3 to 4 sec in second application) and dried under the conditions as indicated below in Table 6 to provide a pale yellow thin film about 0.8 to about 1.0 μm in thickness.

The thin films obtained in Examples 40, 43, 44, 45, 47, 48, 49, 50, 52 and 53 were heat-treated under the conditions as shown below in Table 6 to become black.

Information was written using the resulting optical recording materials having pale yellow or black thin films by exposure to radiation of He-Ne laser (beam diameter 1.0 μm, output 10 mW), whereby the irradiated portion on the black film became pale yellow and that on the pale yellow film was blackened with the portions corresponding to bits precisely formed. Table 6 below shows also the size of the portions corresponding to bits.

TABLE 6

| Ex. | Intercalated organic material | Drying conditions (°C., min) | Heating conditions (°C., sec) | Color of recording material | Size (bit) (W × L) |
|---|---|---|---|---|---|
| 40 | Ethyl alcohol | 50 × 30 | 250 × 3 | Black | 1.1 × 3.0 |
| 41 | Acetone | 150 × 30 | — | Pale yellow | 1.1 × 3.0 |
| 42 | Ethylamine | 100 × 60 | — | " | 1.0 × 2.8 |
| 43 | Diethyl sulfone | 50 × 30 | 250 × 3 | Black | 0.8 × 2.1 |

TABLE 6-continued

| Ex. | Intercalated organic material | Drying conditions (°C., min) | Heating conditions (°C., sec) | Color of recording material | Size (bit) (W × L) |
|---|---|---|---|---|---|
| 44 | Dimethyl sulfoxide | 50 × 30 | 350 × 1 | " | 0.8 × 2.1 |
| 45 | Nitrosoaniline | 50 × 30 | 250 × 1 | " | 0.9 × 2.1 |
| 46 | Nitroethanol | 100 × 60 | — | Pale yellow | 1.1 × 2.7 |
| 47 | Ethylhydrazine | 50 × 50 | 200 × 0.1 | Black | 1.1 × 2.5 |
| 48 | Methylurea | 100 × 30 | 300 × 3 | " | 1.0 × 2.2 |
| 49 | Ethylene glycol | 50 × 30 | 250 × 3 | " | 1.0 × 2.1 |
| 50 | Acetic acid | 50 × 30 | 250 × 3 | " | 1.1 × 2.8 |
| 51 | Nitrocellulose | 100 × 30 | — | Pale yellow | 1.1 × 2.8 |
| 52 | Saccharose | 50 × 30 | 250 × 5 | Black | 1.0 × 2.5 |
| 53 | Hydrazine hydrochloride | 50 × 20 | 200 × 0.1 | " | 1.1 × 2.5 |

(Note: W × L stands for width × length.)

We claim:

1. An optical recording material comprising a base and a thin film formed on the base and consisting essentially of oxides having $V_2O_5$ as the matrix and represented by the formula $(V_2O_5)_{1-x}(M_yO_z)_x$, wherein $M_yO_z$ is at least one of metal oxides, metalloid oxides and nonmetal oxides, M is at least one of Li, Na, K, Cs, Be, Mg, Ca, Sr, Ba, Y, Ti, Zr, Nb, Ta, Cr, Mo, W, Mn, Fe, CO, Ni, Ru, Rh, Pd, Os, Cu, Ag, Au, Zn, Cd, Hg, B, Al, Ga, In, Tl, Si, Ge, Sn, Pb, P, As, Sb, Bi, Se, La, Ce, Nd, Gd, Tb and Er, and $0 \leq X < 1$, and which have an amorphous layer structure wherein the lattice planes of the $V_2O_5$ matrix are arranged in the direction of the c axis and the layers of $V_2O_5$ in the thin film are randomly arranged in the directions of the a and b axes, said thin film having been prepared by applying to the base a solution, sol solution or gel solution of said amorphous oxides and evaporating off the solvent from said solution.

2. An optical recording material according to claim 1 wherein the optical recording material is irradiated with signal light to form pits and/or bumps on the irradiated portion of the recording material.

3. An optical recording material according to claim 1 wherein the optical recording material is irradiated with signal light so that the irradiated portion undergoes a phase transition from amorphous to crystal structure.

4. An optical recording material comprising a base and a thin film formed on the base and consisting essentially of oxides having $V_2O_5$ as the matrix and represented by the formula $(V_2O_5)_{1-x}(M_yO_z)_x$, wherein $M_yO_z$ is at least one of metal oxides, metalloid oxides and nonmetal oxides, M is at least one of Li, Na, K, Cs, Be, Mg, Ca, Sr, Ba, Y, Ti, Zr, Nb, Ta, Cr, Mo, W, Mn, Fe, Co, Ni, Ru, R,, Pd, Os, Cu, Ag, Au, Zn, Cd, Hg, B, Al, Ga, In, Tl, Si, Ge, Sn, Pb, P, As, Sb, Bi, Se, La, Ce, Nd, Gd, Tb and Er, and $0 \leq x < 1$, and which have an amorphous layer structure wherein the lattice planes of the $V_2O_5$ matrix are regularly arranged in the direction of the c axis and the layers of $V_2O_5$ in the film are randomly arranged in the directions of the a and b axes, and in which one of organic materials, organic metallic compounds, inorganic metallic compounds and inorganic metalloid compounds is intercalated between the layers of the amorphous oxides, said film being formed by applying to the base a solution, sol solution or gel solution of said amorphous oxides and evaporating off the solvent from said solution.

5. An optical recording material as defined in claim 4 wherein the organic material is at least one of dyes and light-absorbable colorants.

6. An optical recording material as defined in claim 4 wherein the organic metallic compound is at least one of benzene thiol-nickel complex, 1,2,3,4-tetrachloro-5,6-dithiol-nickel complex, bis(diiminosuccinonitrilo)-nickel complex, and lead phthalocyanine, titanium phthalocyanine, cobalt phthalocyanine, nickel phthalocyanine and tetradehydrocholine colorants.

7. An optical recording material as defined in claim 4 wherein the inorganic metallic compound and metalloid compound are at least one of metallic and metalloid oxides, hydroxides, and salts of Cr, Mo, W, Fe, Co, Mn, Ti, Nb, Ni, Cu, Ag, Tl, Pb, Bi, Nd, V, Hg, Sn, In, Cd, Zn, Tb, Gd, Te and Ge.

8. An optical recording material as defined in claim 4 wherein the amount of the intercalated material is about 0.001 to about 1 mole per mole of $V_2O_5$.

* * * * *